(12) United States Patent
Hoellwarth et al.

(10) Patent No.: US 9,939,850 B2
(45) Date of Patent: Apr. 10, 2018

(54) ACCESSORY FOR PORTABLE ELECTRONIC DEVICE

(71) Applicant: APPLE INC., Cupertino, CA (US)

(72) Inventors: Quin C. Hoellwarth, Kuna, ID (US); Brett Gregory Alten, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/153,682

(22) Filed: May 12, 2016

(65) Prior Publication Data

US 2016/0259377 A1 Sep. 8, 2016

Related U.S. Application Data

(63) Continuation of application No. 12/976,879, filed on Dec. 22, 2010, now abandoned, which is a continuation of application No. 12/569,823, filed on Sep. 29, 2009, now abandoned.

(60) Provisional application No. 61/101,623, filed on Sep. 30, 2008.

(51) Int. Cl.
*H04M 1/00* (2006.01)
*G06F 1/16* (2006.01)
*B29C 45/14* (2006.01)

(52) U.S. Cl.
CPC ...... *G06F 1/1669* (2013.01); *B29C 45/14639* (2013.01); *G06F 1/169* (2013.01); *G06F 1/1626* (2013.01); *G06F 1/1632* (2013.01); *Y10T 29/49018* (2015.01)

(58) Field of Classification Search
CPC ..... G06F 1/1669; H04M 1/0214; H04M 1/23; H04M 1/6066; H04M 1/0237; H04B 1/3833; H04W 88/02; H04W 1/7253
See application file for complete search history.

(56) References Cited

U.S. PATENT DOCUMENTS

| | | | |
|---|---|---|---|
| 4,277,842 A | 7/1981 | Richards | |
| 5,479,479 A | 12/1995 | Braiberg et al. | |
| 5,659,888 A | 8/1997 | Kato et al. | |
| 5,896,453 A | 4/1999 | Speaks | |
| 6,082,535 A | 7/2000 | Mitchell | |
| 6,130,945 A | 10/2000 | Shin | |
| 6,168,331 B1 * | 1/2001 | Vann | G06F 1/1626 400/472 |
| 6,208,867 B1 | 3/2001 | Kobayashi | |
| 6,324,380 B1 | 11/2001 | Kiuchi et al. | |
| 6,766,952 B2 | 7/2004 | Luu | |
| 6,785,656 B2 | 8/2004 | Irizarry | |
| 6,975,888 B2 | 12/2005 | Buesseler et al. | |
| 7,031,692 B1 | 4/2006 | Zanzi | |
| D527,176 S | 8/2006 | Andre et al. | |
| 7,110,789 B1 | 9/2006 | Curtiss et al. | |
| D533,348 S | 12/2006 | Andre et al. | |
| 7,206,618 B2 | 4/2007 | Latto et al. | |

(Continued)

*Primary Examiner* — Steve D Agosta
(74) *Attorney, Agent, or Firm* — Downey Brand LLP

(57) ABSTRACT

A cover for a portable electronic device is disclosed. The cover can include at least one electrical component. For example, in one embodiment, an electrical component can be embedded in the cover. When the cover is placed on or mated with the portable electronic device, the electrical component embedded in the cover is able to interact with electrical circuitry of the portable electronic device. Advantageously, the cover can not only provide a protective and/or ornamental covering for the portable electronic device but can also augment the electrical capabilities of the portable electronic device.

20 Claims, 23 Drawing Sheets

(56) References Cited

U.S. PATENT DOCUMENTS

| | | | |
|---|---|---|---|
| 7,230,823 B2 * | 6/2007 | Richardson | G06F 1/1626 |
| | | | 220/23.91 |
| 7,370,983 B2 | 5/2008 | DeWind et al. | |
| D582,405 S | 12/2008 | Andre et al. | |
| D598,407 S | 8/2009 | Richardson et al. | |
| 7,650,007 B2 | 1/2010 | Lullis et al. | |
| 7,778,023 B1 | 8/2010 | Mohoney | |
| 8,092,251 B2 | 1/2012 | Rosenblatt | |
| 8,376,776 B2 | 2/2013 | Rosenblatt | |
| 2002/0193136 A1 | 12/2002 | Halkosaari et al. | |
| 2003/0068035 A1 | 4/2003 | Pirila et al. | |
| 2004/0014506 A1 | 1/2004 | Kemppinen | |
| 2004/0087335 A1 | 5/2004 | Peiker | |
| 2004/0203508 A1 * | 10/2004 | Cauwels | H04M 1/72544 |
| | | | 455/90.3 |
| 2005/0128108 A1 * | 6/2005 | Fong | G06F 3/0219 |
| | | | 341/22 |
| 2006/0058073 A1 | 3/2006 | Kim | |
| 2007/0002025 A1 * | 1/2007 | Sauer | G06F 1/1626 |
| | | | 345/168 |
| 2007/0053523 A1 | 3/2007 | Iuliis et al. | |
| 2007/0270663 A1 | 11/2007 | Ng et al. | |
| 2007/0271116 A1 | 11/2007 | Wysocki et al. | |
| 2008/0181706 A1 * | 7/2008 | Jackson | G06F 3/0235 |
| | | | 400/482 |
| 2009/0168088 A1 | 7/2009 | Rosenblatt | |
| 2009/0183264 A1 | 7/2009 | Huang | |
| 2009/0305748 A1 | 12/2009 | Piekarz | |
| 2010/0078343 A1 | 4/2010 | Hoellwarth et al. | |
| 2011/0090626 A1 | 4/2011 | Hoellwarth et al. | |
| 2011/0273852 A1 | 11/2011 | Debrody et al. | |
| 2012/0081213 A1 | 4/2012 | Rosenblatt | |

\* cited by examiner

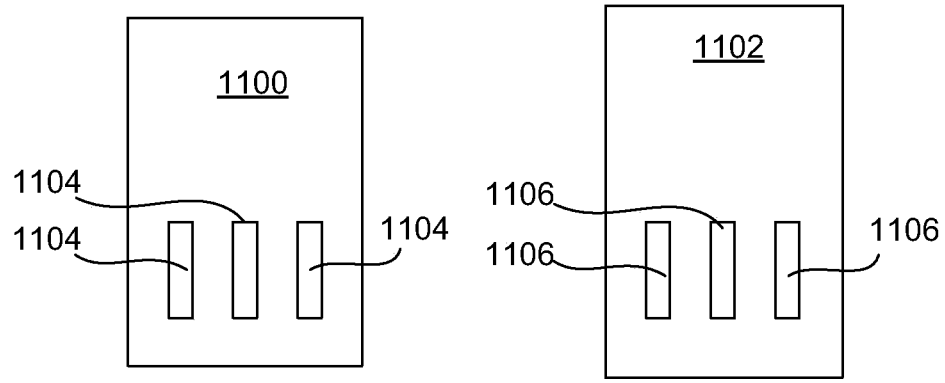
*FIG. 11A*  *FIG. 11B*
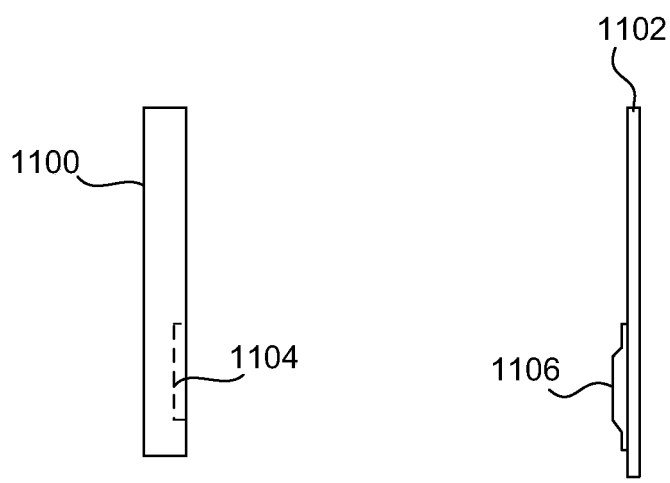
*FIG. 11C*  *FIG. 11D*

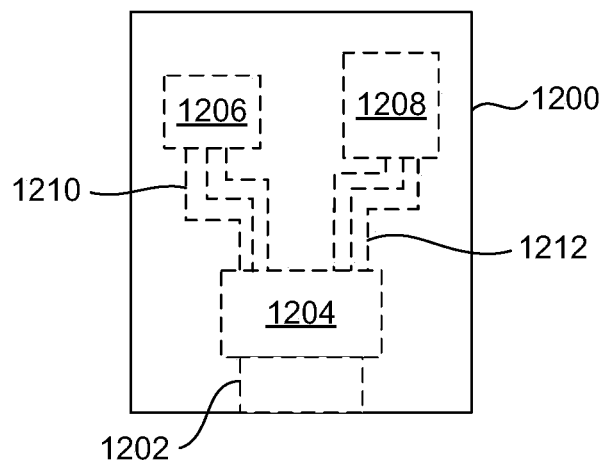
FIG. 12A
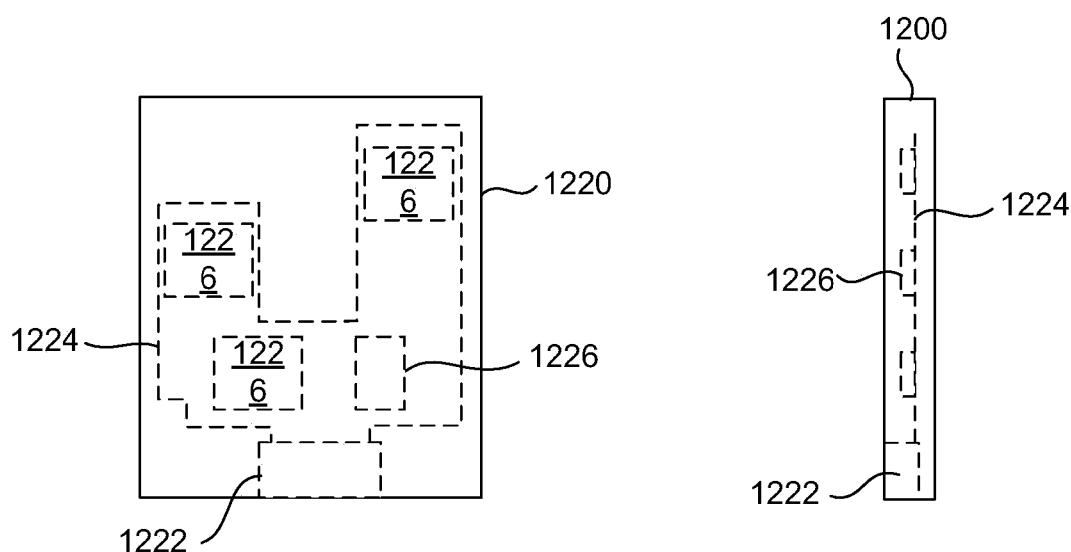
FIG. 12B  FIG. 12C

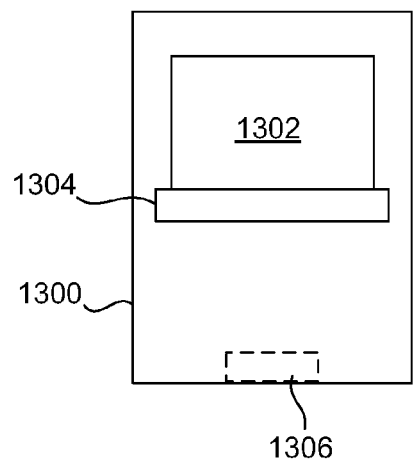
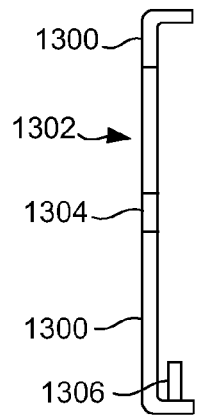
FIG. 13A  FIG. 13B
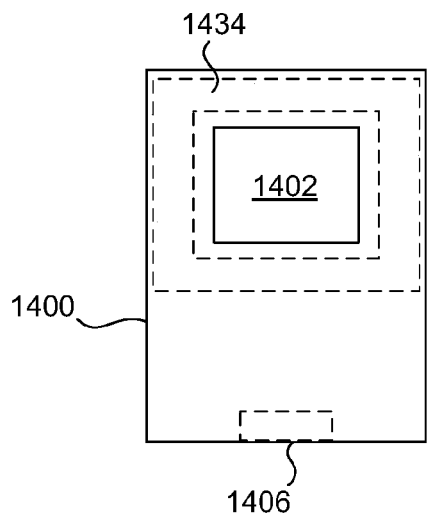
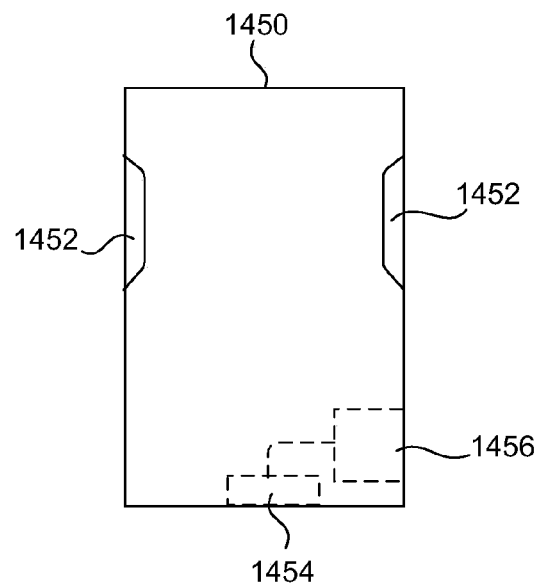
FIG. 14A  FIG. 14B

ACCESSORY FOR PORTABLE ELECTRONIC DEVICE

CROSS-REFERENCES TO RELATED APPLICATIONS

This application is a continuation of U.S. patent application Ser. No. 12/976,879, filed Dec. 22, 2010; which is a continuation of U.S. patent application Ser. No. 12/569,823 filed Sep. 29, 2009; which claims priority to U.S. Provisional Application No. 61/101,623, filed Sep. 30, 2008. The disclosures of each are herein incorporated by reference in their entirety.

BACKGROUND OF THE INVENTION

Portable electronic devices are commonplace today. Some examples of portable electronic devices include portable digital assistants, portable media players, mobile telephones, and portable game players.

FIGS. 1A-1C are diagrammatic illustrations of a conventional portable electronic device 100. More specifically, FIG. 1A is a perspective view of the portable electronic device 100, FIG. 1B is a front view of the portable electronic device 100, and FIG. 1C is a back view of the portable electronic device 100. The portable electronic device 100 includes a housing 102 that forms an external surface of the portable electronic device 100. The housing 102 supports a display 104 and a user input region 106. The display 104 can present a graphical user interface for a user of the portable electronic device 100. The user input region 106 typically includes one or more user input devices that allow the user to interact with the portable electronic device. These user input devices can pertain to buttons, touchpads, and/or dials. The housing 102 of the portable electronic device 100 can also include an external connection port 108 at a bottom side surface 110 of the housing 102. The external connection port 108 allows the portable electronic device 100 to be connected to a host device (e.g., personal computer) or other electronic devices (e.g., docking station), so as to exchange data or to charge a battery (not shown) utilized by the portable electronic device 100. FIG. 1B illustrates a front surface 112 of the portable electronic device 100 having the display 104 and the user input region 106. FIG. 1C illustrates a back surface 114 of the portable electronic device 100. The back surface 114 typically offers no user input or user output capabilities.

Typically, the surfaces of portable electronic devices are relatively easily damaged such as by scratches, dents and the like. Covers, skins or cases have been conventionally utilized to provide protection for the exterior surfaces of portable electronic devices. Accordingly, users can protect their portable electronic devices by placing covers or skins around their portable electronic devices.

Additionally, accessories have been utilized to provide additional functionality to portable electronic devices. Typically, accessories are small electrical products that can attach who a portable electronic device, such as through the external connection port 108. One example of an accessory is a FM receiver provided as a small electrical product that can be attached to a portable electronic device via a cable, which is useful when the portable electronic device does not already include a FM receiver. Another example of an accessory is a wireless data capture device.

BRIEF SUMMARY OF THE INVENTION

The invention pertains to a cover for a portable electronic device. The cover can include at least one electrical component. For example, in one embodiment, an electrical component can be embedded in the cover. When the cover is placed on or mated with the portable electronic device, the electrical component embedded in the cover is able to interact with electrical circuitry of the portable electronic device. Advantageously, the cover can not only provide a protective and/or ornamental covering for the portable electronic device but can also augment the electrical capabilities of the portable electronic device. The invention is particularly well suited for handheld, battery-powered electronic devices.

The invention may be implemented in numerous ways, including, but not limited to, a system, device, apparatus or method. Exemplary embodiments of the invention are discussed below.

As a cover for a handheld, battery-powered, electronic device, where the electronic device has a device housing that contains electrical circuitry, one embodiment can, for example, include at least a cover body configured to be placed over a substantial portion of the device housing of the electronic device, and at least one electrical component provided within the cover body. The at least one electrical component is able to be electrically connected to the electrical circuitry within the device housing when the cover body is placed over a substantial portion of the device housing of the electronic device.

As a method for forming a protective cover for an electronic device, one embodiment can, for example, include at least: providing a mold for the protective cover for the electronic device, obtaining an electrical component to be provided in the protective cover, positioning the electrical component within the mold, and forming the protective cover for the electronic device using the mold. The electrical component within the mold is provided internal to a portion of the protective cover.

As a cover for a portable electronic device, one embodiment can, for example, include at least a cover body that is configured or conformable to an outer housing of the portable electronic device, an electrical connector at least partially embedded within the cover body, and at least one electrical component electrically connected to the at least one electrical connector.

As a cover for a portable electronic device, one embodiment can, for example, include at least a cover body configured for covering at least a substantial portion of the portable electronic device, and at least one electrical component at least partially embedded within the cover body.

As an integrated electrical skin, one embodiment can, for example, include at least a compliant body including an cavity for receiving an electronic device, and one or more electrical components being at least partially disposed within the compliant body. The compliant body being configured to be placed around the electronic device. The at least one of the electrical components being configured to be in communication with the electronic device when the electronic device is placed within the cavity.

Various aspects and advantages of the invention will become apparent from the following detailed description taken in conjunction with the accompanying drawings.

BRIEF DESCRIPTION OF THE DRAWINGS

The invention will be readily understood by the following detailed description in conjunction with the accompanying drawings, in which:

FIGS. 11A-11D illustrate an interconnection system for a portable electronic device 1100 and a cover according to one embodiment;

FIG. 12A is a diagram of a cover for a portable electronic device according to one embodiment;

FIGS. 12B and 12C are diagrams of a cover for a portable electronic device according to one embodiment;

FIGS. 13A and 13B are diagrams of a cover for a portable electronic device according to one embodiment;

FIG. 14A is a front view of a cover for a portable electronic device according to one embodiment;

FIG. 14B is a side view of a cover for a portable electronic device according to one embodiment;

DETAILED DESCRIPTION OF THE INVENTION

The invention pertains to a cover for a portable electronic device. The cover can include at least one electrical component. For example, in one embodiment, an electrical component can be embedded in the cover. When the cover is placed on or mated with the portable electronic device, the electrical component embedded in the cover is able to interact with electrical circuitry of the portable electronic device. Advantageously, the cover can not only provide a protective and/or ornamental covering for the portable electronic device but can also augment the electrical capabilities of the portable electronic device. The invention is particularly well suited for portable, battery-powered electronic devices, and more particularly handheld battery-powered electronic devices. Examples of portable, battery-powered electronic devices can include laptops, tablet computers, media players, phones, GPS units, remote controls, personal digital assistant (PDAs), and the like.

A cover for a portable electronic device can be made from a variety of materials. In one particular embodiment, the cover can be formed from a flexible and/or compliant material that is fitted, i.e., conforms to, the contour of the portable electronic device. For example, in one implementation, the cover is a flexible film (e.g., a label) that attaches to a surface of the portable electronic device. In another example, the cover can be a compliant enclosure formed from materials, such as rubber or silicone, that wrap and stretch around the surfaces of the portable electronic device. The cover can also be referred to as a skin.

Embodiments of the invention are discussed below with reference to FIGS. 2A-18. However, those skilled in the art will readily appreciate that the detailed description given herein with respect to these figures is for explanatory purposes as the invention extends beyond these limited embodiments.

Figure 1A:
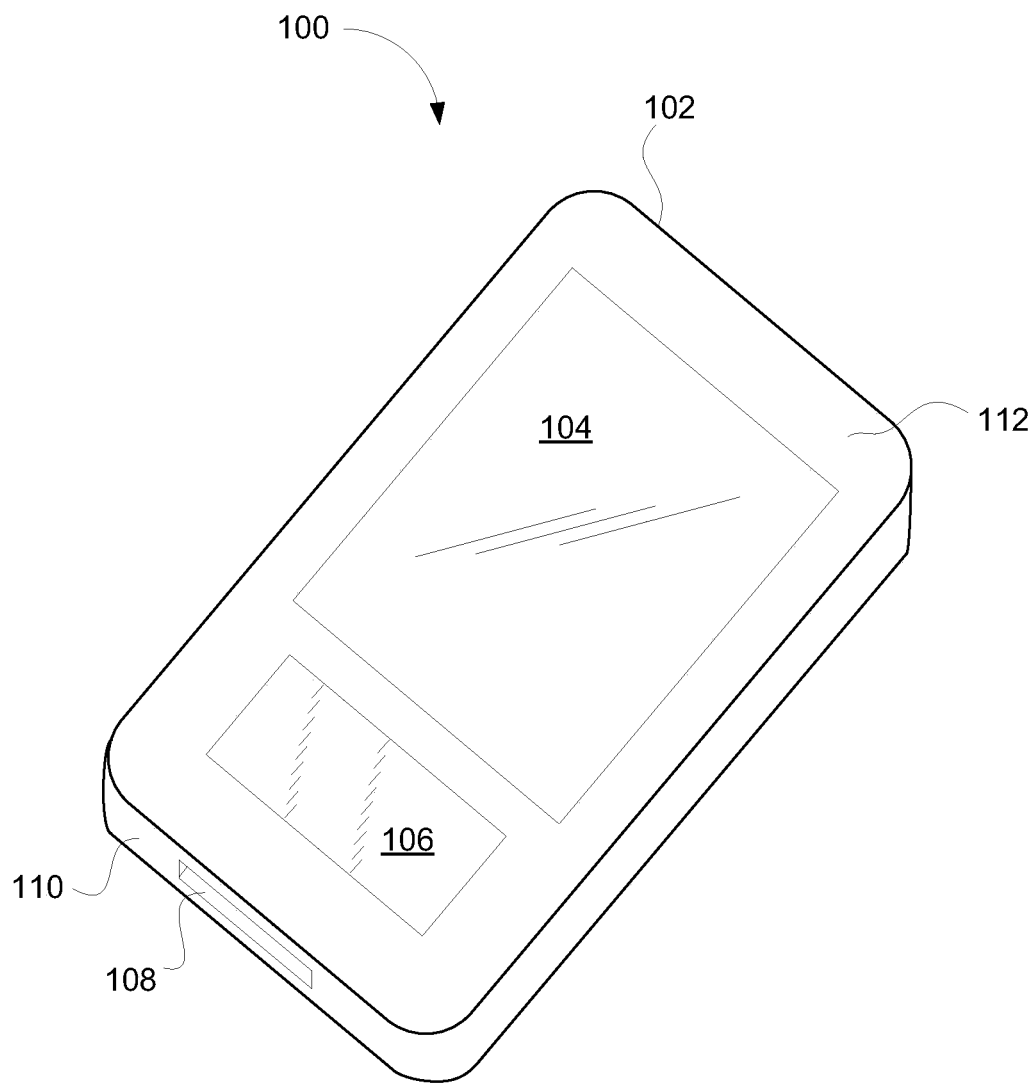
FIGS. 1A-1C are diagrammatic illustrations of a conventional portable electronic device.
Figure 1B:
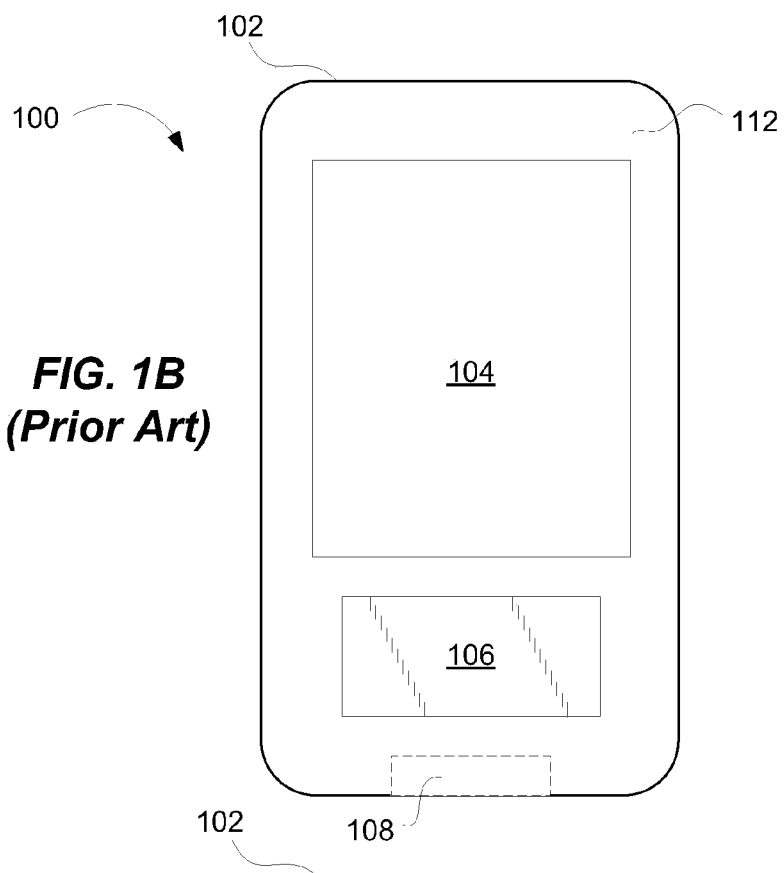
Figure 1C:
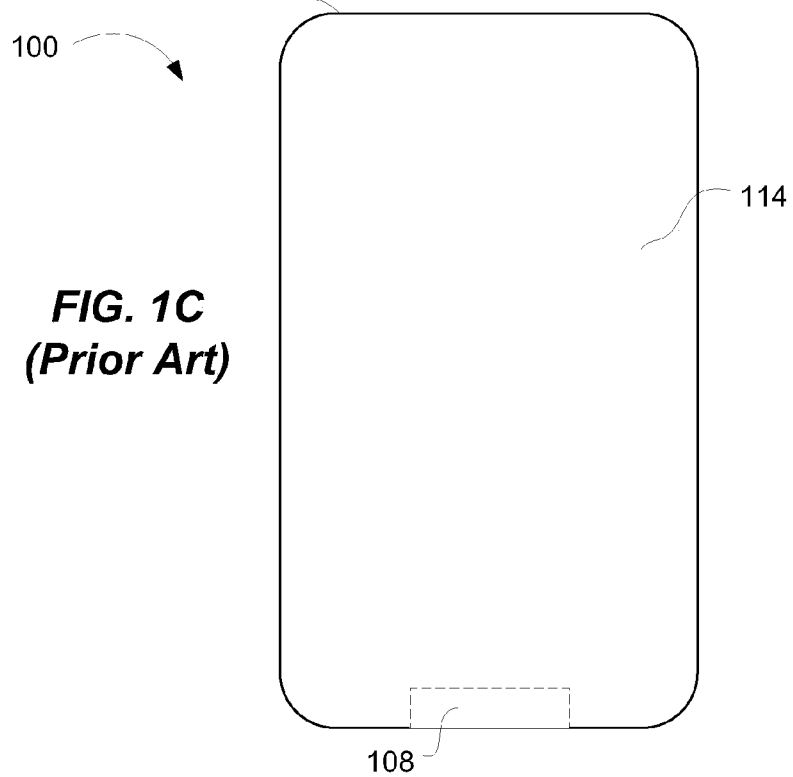
Figure 2:
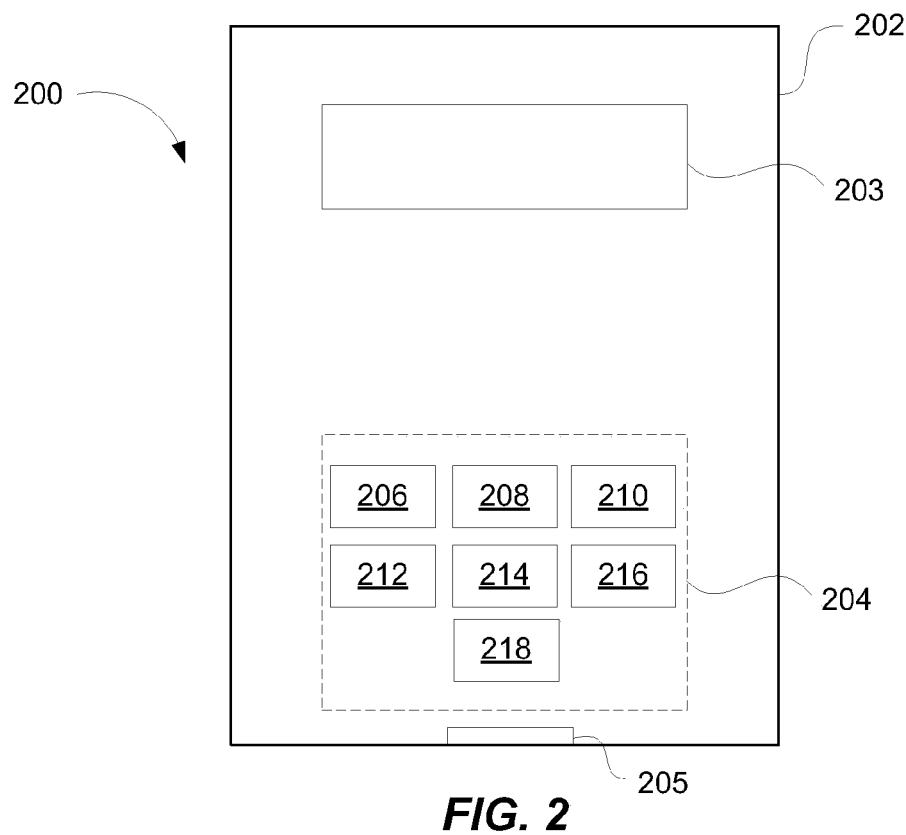
FIG. 2 is a simplified diagram of an electronic cover for a portable electronic device, in accordance with an embodiment of the present invention.

FIG. 2 is a simplified diagram of an electronic cover 200 for a portable electronic device, in accordance with an embodiment of the present invention. The electronic cover 200 may be an outer covering with integrated electronics that can be physically and operatively coupled to a portable electronic device.

The electronic cover 200 may be configured to cover a portion of one or more external surfaces of the portable electronic device for ornamental and/or protective purposes. Additionally, the electronic cover 200 can be configured at act as an electronic accessory to the portable electronic device 200, i.e., a supplementary system that improves the functional capabilities of the portable electronic device. In most cases, the electronic cover 200 is a distinct element, which is not part of the originally designed portable electronic device. Instead, the electronic cover 200 is an add-on or an accoutrement of the portable electronic device. The electronic cover 200 may be configured to help protect the portable electronic device (i.e., it may serve as armor or shock protection that helps prevent structural and/or surface damage to the portable electronic device). Additionally or alternatively, the electronic cover 200 may provide ornamentation to the portable electronic device (i.e., it may help define the overall ornamental appearance of the electronic device). The electronic cover 200 can also permit personalized ornamentation. The electronic cover 200 may also provide tactility in order to improve the feel and grip to the portable electronic device.

The electronic cover 200 can at least partially conforms to the outer shape of the portable electronic device. For example, by providing an internal shape/inner surface and/or being flexible enough to follow the contour of the portable electronic device. The external shape of the outer covering may be widely varied. It may be designed for ornamental, protection, and/or ergonomic reasons. Generally however, it tends to follow the general shape of the portable electronic device.

The electronic cover 200 may for example be laid, set, wrapped, spread upon, about or over a portion of the portable electronic device. The electronic cover 200 may be configured to cover a surface of the portable electronic device including a portion of a single side, multiple sides, and/or all sides of the portable electronic device. For example, the electronic cover 200 may be a film that is applied to a single surface of the portable electronic device (e.g., a portion or all of the front surface). The electronic cover 200 may also be a flexible covering that includes a cavity for receiving the portable electronic device and that wraps/stretches around some portion of the portable electronic device. The outer covering may be referred to (among others) as a case, shield, container, jacket, vest, skin, protector, and the like of the portable electronic device.

The electronic cover 200 generally includes a body or member 202 that couples to the portable electronic device. The body or member 202 may also decouple from the portable electronic device such that it is a considered a removable or detachable. The body or member 202 can be carried by the portable electronic device, but is not part of the portable electronic device. The configuration of the body or member 202 may be widely varied, but is typically configured to cover the outer surface(s) of the portable electronic device. The body or member 202 may be universal in its application (not specific to a particular device) or it may be dedicated to a particular device. In either case, the body or member 202 can be configured to follow the outer contour or shape of the surfaces of the portable electronic device. In one embodiment, the body or member 202 forms a surface layer that attaches to the outer surface of the portable electronic device. In another embodiment, the body or member forms an enclosure that includes surfaces (e.g., walls) that surround the outer surfaces of the portable electronic device. For example, the surfaces may define a cavity for placement of the portable electronic device. The body or member 202 may include access openings and tactile features that are associated with mechanisms of the portable electronic device. The tactile features may also be associated with mechanisms of the covering. Even though the general shape of the body or member 202 may be similar to the portable electronic device, the external surface of the body or member 202 may include one or more or any combination of patterns, recesses, protrusions, ridges, depressions, dimples, flaps, extensions, textures, knurls, and/or the like.

The electronic cover 200 can be formed from a variety of materials including, for example, but not limited to soft, hard, rigid, flexible, compliant, etc. Some examples of material types include but are not limited to paper, plastic, metal, rubber, silicon, fabric, foams, leather, ceramics, films, and the like. The material generally depends on the desired needs of the outer covering. It should be appreciated that the outer covering is not limited to a single material and may include a combination of materials. The exact combination may depend on the needs of the outer covering. Examples of trade-offs include rigid/flexible, soft/hard, soft1/soft2, plastic/metal, silicon/plastic, etc. In one particular embodiment, the outer covering is formed from flexible and/or compliant materials such as rubber, silicone, fabrics (e.g., neoprene), and various films.

The electronic cover 200 can be adhered to or around the portable electronic device using a variety of techniques including but not limited to: adhesive, friction, static, elasticity, suction, fasteners, snaps, connectors, and the like. In some examples, the electronic cover 200 forms an enclosure that includes a void, cavity, opening, pocket or compartment for receiving a portable electronic device therein (i.e., the portable electronic device can be placed into the void). In another example, the electronic cover 200 can be press fit onto the portable electronic device. In yet other examples, the electronic cover 200 is a surface (e.g., platform, film) that is attached to a surface of the portable electronic device (e.g., adhesive backed surface or surface with static electricity properties or a surface with suction cups). In yet other examples, the electronic cover 200 is stretched around the portable electronic device (e.g., the outer covering is flexible and conforms to the outer shape of the portable electronic device). In other examples, the electronic cover 200 can trap or surround the portable electronic device between multiple sections (i.e., lower and upper half).

In accordance with one embodiment, the electronic cover 200 may be formed from a soft, flexible and/or compliant material that can be wrapped around the various surfaces of the portable electronic device. For example, the material may allow the covering to stretch over the portable electronic device (e.g., form fitting). By way of example, the electronic cover 200 may be formed from a stretchable material that includes a small opening that can be stretched to accommodate the larger portable electronic device as it is inserted into the electronic cover 200 outer covering. Once the portable electronic device is inserted, the material confirms to the shape of the portable electronic device, which provides a tight fit around the surfaces of the portable electronic device. The electronic cover 200 may, for example, surround multiple side surfaces if not all of the side surfaces of the portable electronic device. In one particular example, the material may be silicon. These types of coverings are sometimes referred to as "skins" as they create a new outer layer analogous to skin.

The electronic cover 200 may include a variety of access openings 203 depending on the configuration of the portable electronic device. The access openings 203 provide access to features of the portable electronic device. The access openings may, for example, provide openings for one or more displays, buttons, switches, navigation pads, keys, touch pads, receivers, microphones, speakers, connectors, jacks, sensors, antennas, cameras and the like. The electronic cover 200 may also include an access opening for helping place the outer covering relative to the portable electronic device as for example in situations where the outer cover surrounds a majority of the sides of the portable electronic device.

In accordance with one embodiment, the electronic cover 200 can be configured to include electronic circuitry 204. The electronic circuitry 204 can include one or more electronic components, such as one or more electronic subassemblies, for connection to the portable electronic device. The one or more electronic subassemblies may interface with the portable electronic device via an existing connector of the portable electronic device, via a special connector dedicated to the outer covering or via a wireless connection. The one or more electronic subassemblies can be embedded (partially or entirely) within the walls of the electronic cover 200 and/or the electronic subassemblies can be carried by the electronic cover 200 as for example on an exterior or interior surface. The electronic subassemblies may be used to provide additional functionality to the portable electronic device and/or to extend functionalities of the portable electronic device to the electronic cover 200.

Advantageously, the cover or outer covering according to various embodiments can provide a paradigm shift for electronic device covers, which have conventionally been provided for protection of outer physical surfaces of portable electronic devices. Now, the cover or outer covering can operate as an electrical accessory for the portable electronic device. Here, the cover or outer covering includes active elements that can interact with active element of a portable electronic device. The cover or outer covering having active elements can be considered a smart cover or active cover. In order to be smart and/or active, the smart or active outer cover generally includes one or more electrical components that are carried by the body or member 202 of the electronic cover 200. In some cases, the components can be discrete separate components that are spaced apart from one another while still maintaining communications there between (e.g., wires, traces, flexes). In other cases, at least a portion of the components can be grouped together onto a single carrier such as a printed circuit board, flex circuit, rigid flex, subassembly or electronic enclosure. These components may be embedded and/or surface mounted. Several of the components will be described in detail below.

In one embodiment, the electronic cover 200 can include a connection terminal 205 for operatively connecting to the portable electronic device. The connection terminal 205 may serve as a data and/or power connection. In wired connections, the connection terminals are configured to physically connect so as to operatively couple the electronic cover 200 to the portable electronic device. For example, the interface may include a mating connection made up of corresponding mating connectors. The connector may be dedicated to the interface between covering and device. The connector may also be associated with an existing connector of the device. For example, if the device includes a female port then the covering may include a male protrusion that engages the female port. In order to allow further connection to the device when the covering is on the device, the connector of the covering may include a second connector, which in one implementation can mimic the connector of the device. In one embodiment, the first and second connectors are integrated into a single connector unit. For example, the covering may include a female/male connector. In another embodiment, the first and second connectors are separated in space but electrically coupled together as for example through the use of conductive traces, flex circuits or wires.

The configuration of the contacts of the connector and the signals they carry may be widely varied. For example, the spacing, numbers of pins and layout of pins (rows/columns) and the like of the connector may be varied. Furthermore, the contacts may be used for data, ground, charging, protocols, accessory identifier, audio, line in, line out, video, sensors, etc. By way of example, the connection interface may be associated with one or more of the following interfaces: PS/2, serial, parallel, network (e.g., Ethernet), USB, Firewire and/or the like. The connection interface may also include one or more remote, audio (digital or analog), video (digital or analog), and/or charging interfaces. In one example, the connection interface corresponds to a thirty (30) pin connector utilized in devices manufactured by Apple Inc. of Cupertino Calif.

In wireless connections, the terminals do not physically connect. For example, the interface may include a receiver and transmitter (transceiver) for wireless communications there between. By way of example, the connection interface may include one or more of the following interfaces: Bluetooth, WiFi, 802.11, optical (e.g., infrared, magnetic link (induction) and/or the like.

The electronic cover 200 can include a controller 208 (e.g., processor or CPU) configured to execute instructions and to carry out operations associated with either the electronic cover 200 or a portable electronic device coupled thereto. For example, using instructions retrieved, for example, from memory, the controller may control the reception and manipulation of input and output data between components of the electronic cover 200 as well as components of a portable electronic device coupled thereto. The controller may act alone or work with the controller of the portable electronic device depending on the needs of the system.

The controller 208 can be implemented on a single chip, multiple chips or multiple electrical components. For example, various architectures can be used for the controller, including dedicated or embedded processor, single purpose processor, controller, ASIC, etc. By way of example, the controller may include microprocessors, DSP, A/D converters, D/A converters, compression, decompression, etc. In most cases, the controller together with program code (e.g., firmware, software), such as an operating system, can operate to produce and use various data. The operating system may correspond to well known operating systems such as OS/2, DOS, Unix, Linux, and Palm OS, or alternatively to special purpose operating system, such as those used for limited purpose appliance-type devices. The program code and data may reside in a data storage device (e.g., memory) within the outer covering and/or the portable electronic device coupled thereto. The data storage device may include read-only memory (ROM), random-access memory (RAM), flash memory, etc. These components can be implemented on a single chip, multiple chips or multiple electrical components. The data storage device can alternatively or additionally include a hard disk drive such as a micro drive and/or removable storage device such as mini DVD drives or a card slot for receiving mediums such as memory cards (or memory sticks).

The electronic cover 200 can also include various input devices 210. These one or more input devices can be connected with the portable electronic device, such as through the connection interface. The one or more input devices can be configured to transfer data from the outside world into the outer covering and/or a portable electronic device coupled thereto. The one or more input devices may correspond to data entry mechanisms or data capture mechanisms. The input devices may include touch sensing devices, such as touch screens, touch pads and touch sensing surfaces, or mechanical actuators, such as button, switches, keys or wheels.

The electronic cover 200 can also include one or more data capture mechanisms or sensors 212 that can be operatively connected with the portable electronic device, such as through the connection interface. The one or more data capture mechanisms or sensors 212 may, for example, include motion sensing devices such as accelerometers, force sensors, image sensors, microphones, biometric sensors, temperature sensors, light sensors, proximity sensors, and/or the like.

The electronic cover 200 can also include one or more output devices 214 that can be operatively connected to the portable electronic device, such as through the connection interface. The output devices 214 of the electronic cover 200 can be configured to receive data from the portable electronic device. The output devices may include one or more of: displays (such as an LCD), speakers or jacks, audio/tactile feedback devices, light indicators, and the like.

The electronic cover 200 can also include a power module 216. The power module may include a battery. The electronic cover 200 may also include an on-board charging system. The charging system may include an inductance charging means and/or a solar charging means (e.g., photovoltaics) and/or a kinetic charging means. For example, the outer covering may include an inductive surface that mates with a corresponding external inductive surface in order to charge the battery included in the outer covering and/or the battery of the portable electronic device. In another example, the outer covering may include a photovoltaic panel in order to provide power and/or charge the battery included in the outer covering and/or the battery of the portable electronic device. In yet another example, a flexible or compliant body may enable a kinetic charging mechanism that produces power via physical action such as squeezing.

The electronic cover 200 can also include one or more antennas 218. The portable electronic device or the outer covering can include a transceiver that can be electrically coupled to one or more antennas so as to receive and transmit electromagnetic signals.

Figure 3:
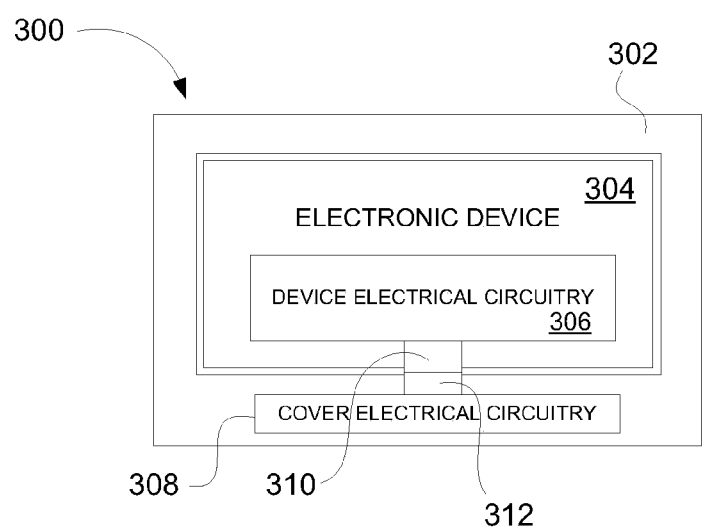
FIG. 3 is a block diagram of an electronic system or a covered electronic device according to one embodiment of the invention.

FIG. 3 is a block diagram of an electronic system or a covered electronic device 300 according to one embodiment of the invention. The covered electronic device 300 includes a cover 302 that covers at least a portion if not a significant portion of an electronic device 304. The electronic device 304 includes device electrical circuitry 306. The device electrical circuitry 306 is electrical circuitry that is associated with the electronic device 304.

The cover 302 also includes cover electrical circuitry 308. The cover electrical circuitry 308 is electrical circuitry that is associated with the cover 302 for the electronic device 304. The cover 302 may, for example, generally correspond to the cover shown in FIG. 2. The cover electrical circuitry 308 is, in one embodiment, formed substantially within the cover 302. For example, the cover electrical circuitry 308 can be molded within the cover 302. The cover electrical circuitry 308 can be partially or completely internal to the cover 302. The electronic device 304 is typically a portable electronic device. The portable electronic device can, for example, pertain to a portable computer such as a laptop or tablet computer, or a handheld device such as a digital assistant, a portable media player, a mobile telephone, a portable game player, GPS unit, remote control and/or the like. The term hand-held generally means that the electronic device has a form factor that is lightweight (e.g., less than about 1 pound (or 0.5 kilograms) and small enough to be comfortably held in one hand.

Additionally, the covered electronic system 300 is configured such that a removable interconnection can be established between the device electrical circuitry 306 and the cover electrical circuitry 308. Accordingly, when the removable interconnection is being provided, the device electrical circuitry 306 can make use of, or be augmented by, the cover electrical circuitry 308. In one embodiment, the removable interconnection can be provided by a pair of connectors, one connector being part of the electronic device 304 and another connector being part of the cover 302 for the electronic device 304. That is, to provide electrical connection between the device electrical circuitry 306 and the cover electrical circuitry 308, the electronic device 304 can include an electrical connector 310, and the cover 302 can include a counterpart electrical connector 312. In one example, when the cover 302 is placed about the electronic device 304, the electrical connector 310 of the electronic device 304 can receive the counterpart of electrical connector 312 of the cover 302, thereby establishing electrical connection between the device electrical circuitry 306 and the cover electrical circuitry 308.

The one or more electrical components provided in the cover 302 can be used (i) to extend input/output capabilities of the portable electronic device, (ii) to augment functional capabilities of the portable electronic device; and/or (iii) to associate ornamental aspects to the portable electronic device. The electronic components can pertain to sensors, connectors, electronic devices, circuitry (e.g., integrated circuits), or electrical substrates (e.g., printed circuit boards, flex-circuits). More specifically, the electronic components provided in the cover can be or can be used to provide one or more of: haptics, wireless communication, position navigation, force feedback, processor, user input device, game player control, light source, battery, photovoltaic, antenna, data storage, etc.

Figure 4A:
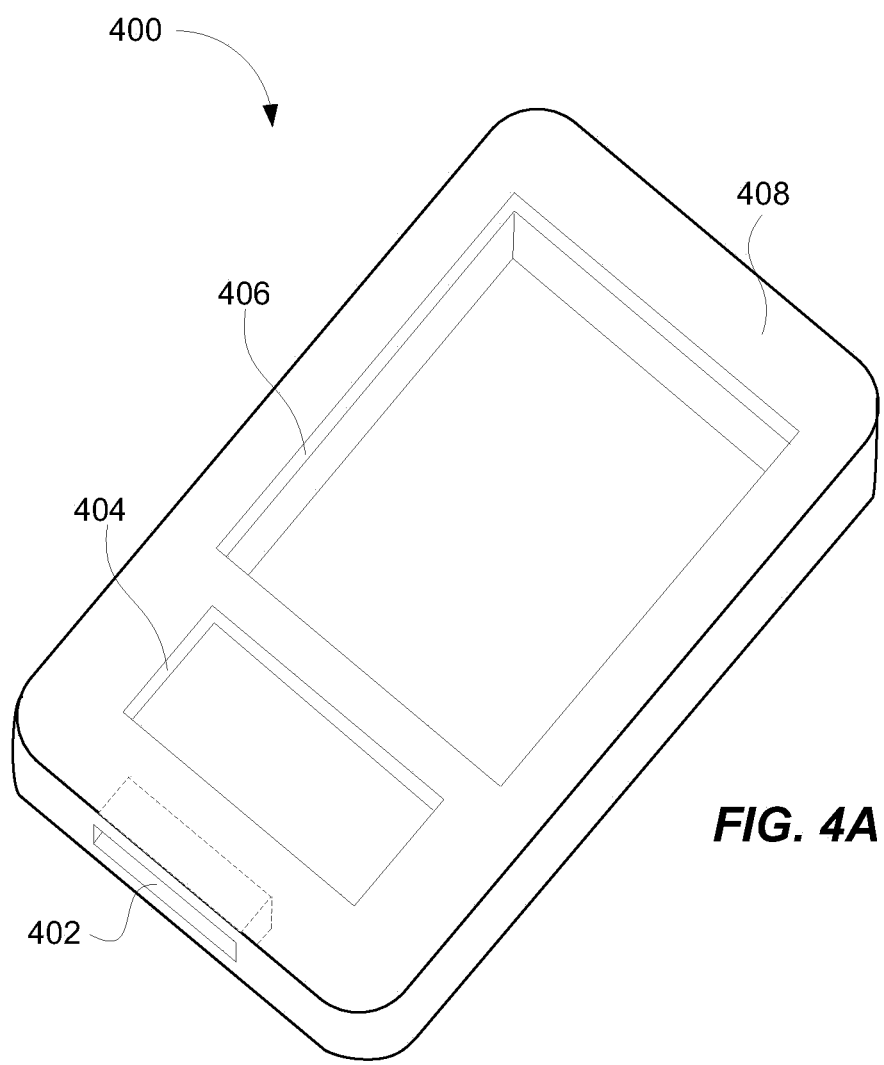
FIGS. 4A-4G are diagrammatic illustrations of a portable electronic device cover according to one embodiment of the invention.
Figure 4B:
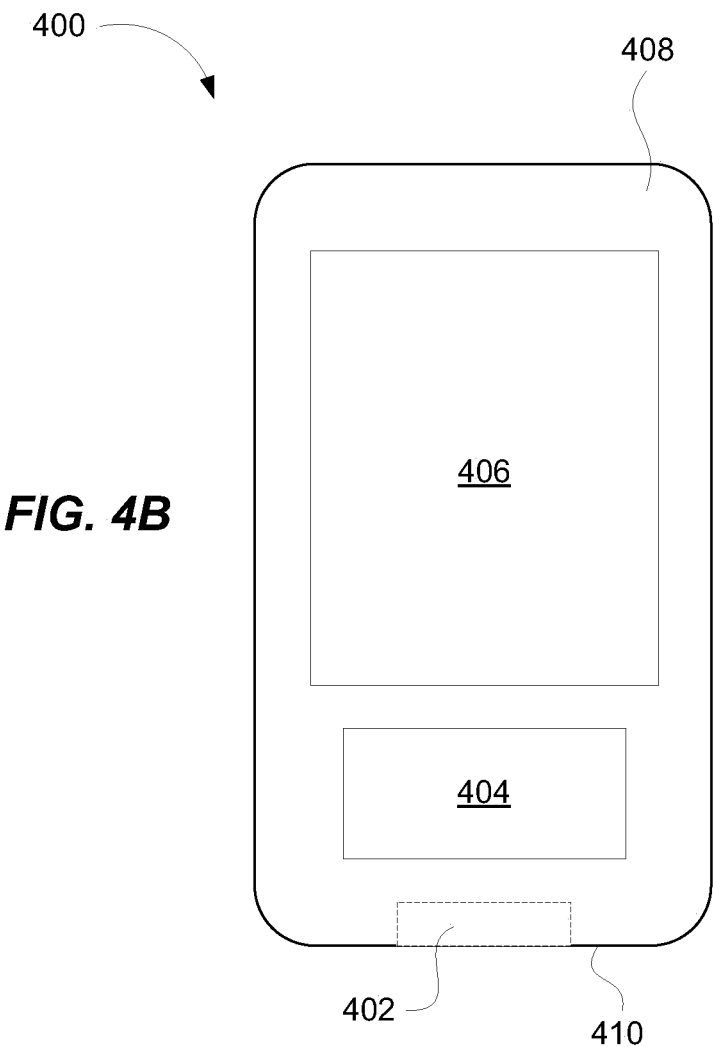
Figure 4C:
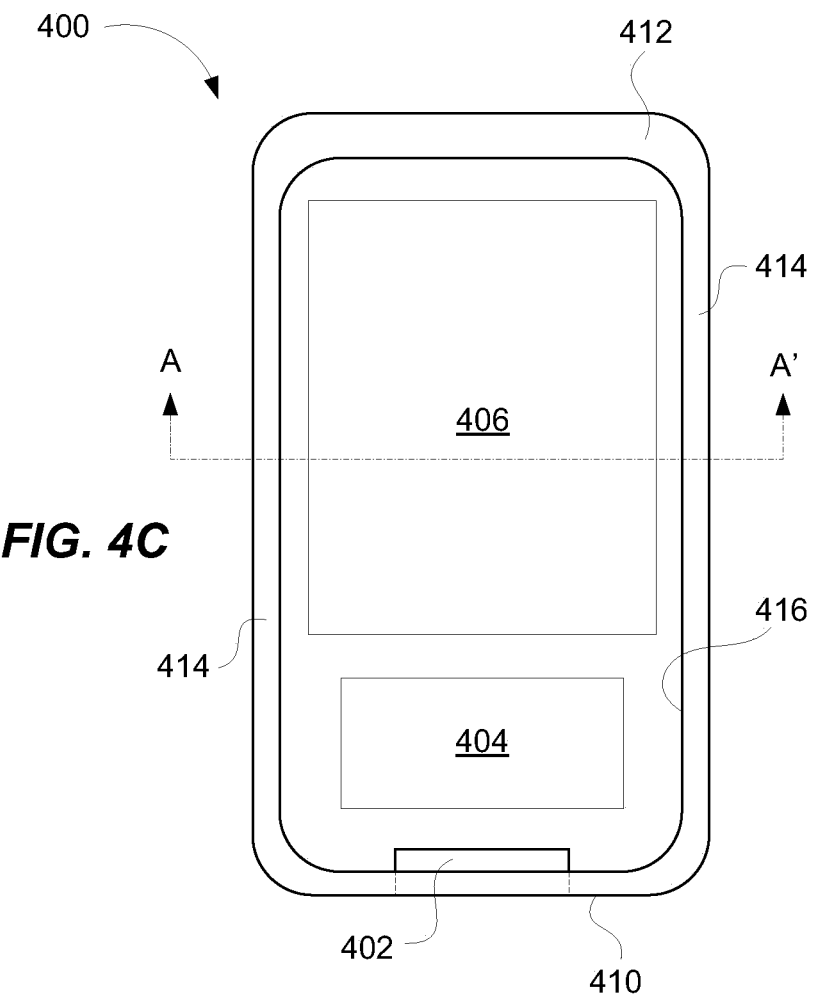
Figure 4D:
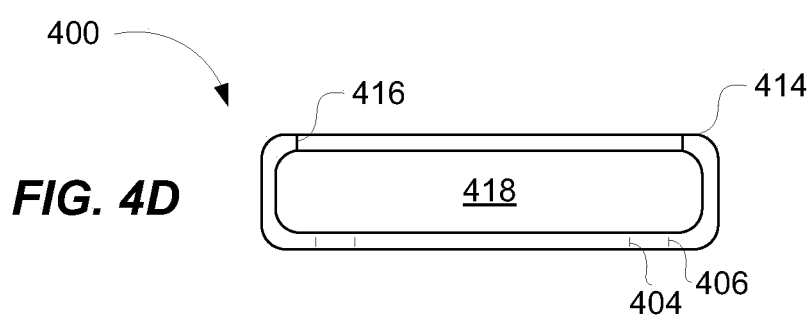
Figure 4E:
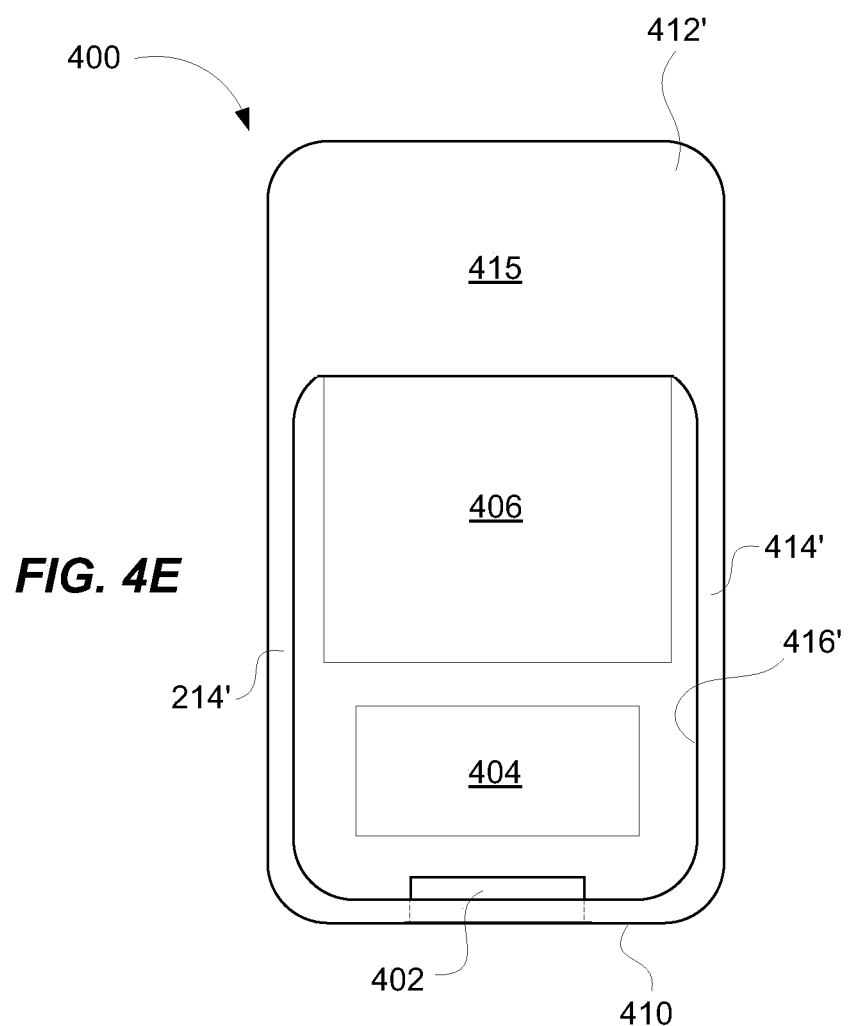
Figure 4F:
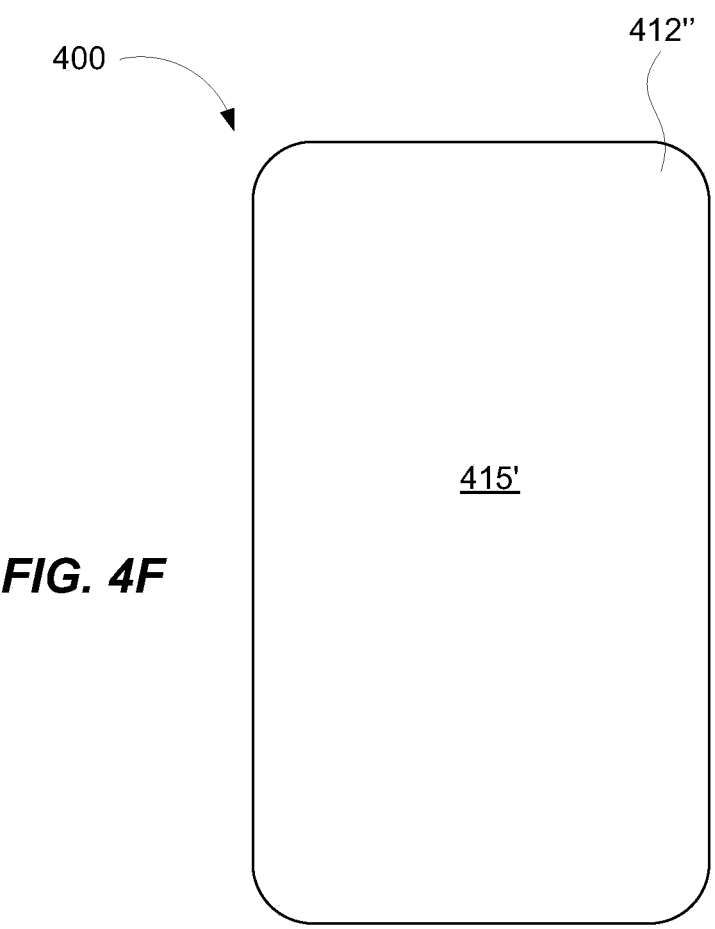
Figure 4G:
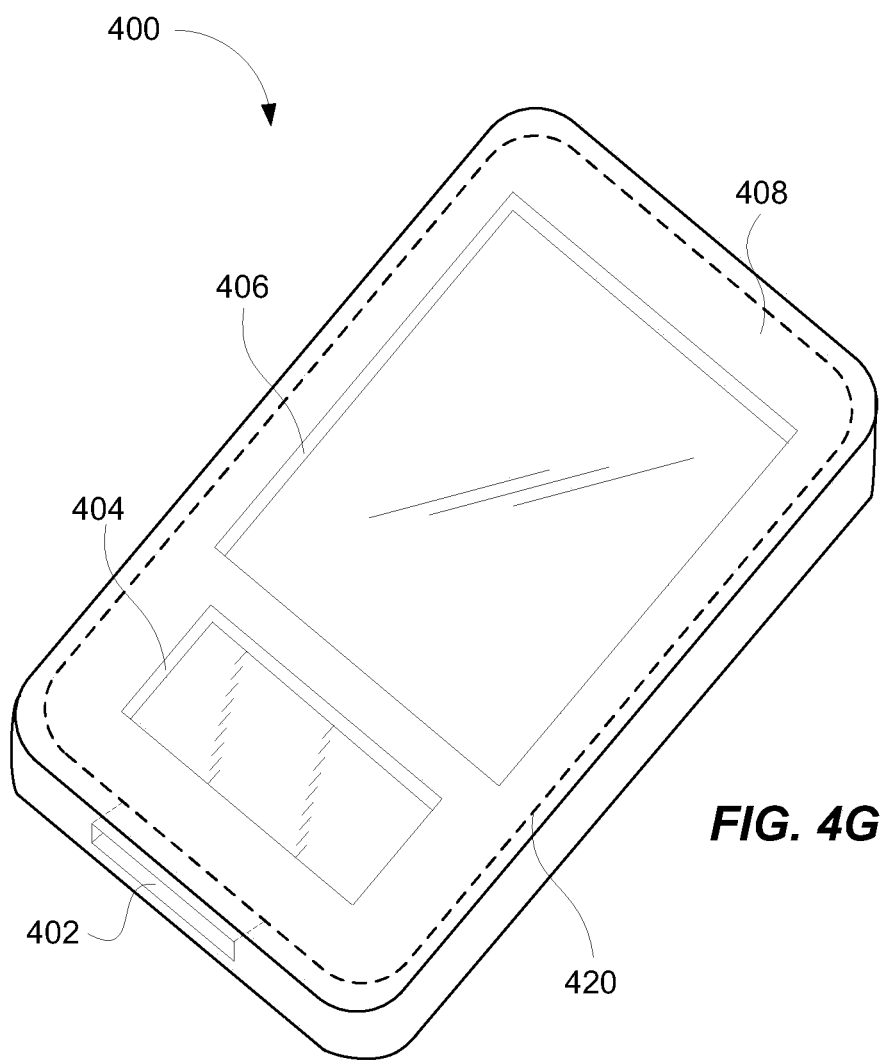

FIGS. 4A-4G are diagrammatic illustrations of a portable electronic device cover 400 according to one embodiment of the invention. The portable electronic device cover 400 may, for example, correspond to the electronic cover 200 illustrated in FIG. 2 or the cover 302 in FIG. 3. More specifically, FIG. 4A is a perspective view of the portable electronic device cover 400, FIG. 4B is a front view of the portable electronic device cover 400, FIG. 4C is a rear view of the portable electronic device cover 400, and FIG. 4D is a cross-sectional view of the portable electronic device cover 400. FIGS. 4E and 4F are alternate rear views of the portable electronic device cover 200. FIG. 4G is a perspective view of the portable electronic device cover 400 having an electronic device contained therein.

The portable electronic device cover 400 includes an electrical connector 402 that facilitates connection with an external connection port on a portable electronic device. When the portable electronic device cover 400 is placed around a portable electronic device, the electrical connector 402 can be mechanically and electrically connected to the external connection port of the portable electronic device. Consequently, the electrical connector 402 provided within the portable electronic device cover 400 serves to enable one or more electrical components associated with the portable electronic device cover 400 to electrically coupled to electrical circuitry within the portable electronic device. In one embodiment, the one or more electrical components associated with the portable electronic device cover 400 pertain to one or more electrical components provided within the electrical connector 402. In another embodiment, the one or more electrical components associated with the portable electronic device cover 400 pertain to one or more electrical components provided within the portable electronic device cover 400, where at least one of the one or more electrical components is not provided within the electrical connector 402. As shown in FIG. 4B, in one embodiment, the electrical connector 402 can be positioned at a bottom edge surface 410 of the portable electronic device cover 400. However, more generally, the electrical connector 402 can be positioned as appropriate for use with one or more portable electronic devices.

In one embodiment, the portable electronic device cover 400 can include a first opening 404 and a second opening 406. The first opening 404 and the second opening 406 can be provided at a front surface 408 of the portable electronic device 400. The first opening 404 within the portable electronic device cover 400 can facilitate user interaction with the portable electronic device. The second opening 406 within the portable electronic device can be commensurate with a display of the portable electronic device that is being covered by the portable electronic device cover 400.

FIG. 4C illustrates a rear surface 412 for the portable electronic device cover 400. In this embodiment, the rear surface 412 has a band portion 414 that extends around the periphery of the rear surface 412. In this embodiment, the rear surface 412 has a large opening 416 given that the band portion 414 extends inward from the edge of the periphery to a minimum extent. The opening 416 allows the portable electronic device to be inserted into the portable electronic device cover 400 and connected with the electrical connector 402.

FIG. 4D illustrates a cross-sectional view of the portable electronic device cover 400 with reference to reference line A-A' shown in FIG. 4C. The portable electronic device cover 400 forms a cavity 418. The portable electronic device can be received in the cavity 418. Typically, when the portable electronic device is provided within the cavity 418, the cavity is substantially consumed by the portable electronic device. In one embodiment, the cavity 418 can be configured to correspond to the external shape of the portable electronic device. The portable electronic device cover 400 can, for example, be formed from hard plastic or soft rubber or silicone. In the same or another embodiment, the cavity 418 can be conformable (e.g., form-fitting) to the external shape of the portable electronic device. The cavity 418 is conformable when the portable electronic device cover 400 is formed from a conformable material, such as rubber, silicone, etc.

FIG. 4E illustrates an alternative rear surface 412' for the portable electronic device cover 400. In this embodiment, the rear surface 412' has a band portion 414' that extends around the lower periphery of the rear surface 412'. In this embodiment, the rear surface 412' has a covered portion 415 at an upper periphery of the rear surface 412' and an opening 416' formed at a lower portion of the rear surface 412'. The opening 412' is formed at the lower portion by the band portion 414' extending inward from the edge of the periphery to a minimum extent. The opening 416' allows the portable electronic device to be inserted into the portable electronic device cover 400 and connected with the electrical connector 402. In still other embodiments, the opening 416' can be smaller and positioned elsewhere, such as at an edge.

FIG. 4F illustrates an alternative rear surface 412" for the portable electronic device cover 400. In this embodiment, the rear surface 412" does not have a band portion but rather includes a fully enclosed rear surface 412". In this embodiment, the rear surface 412" has a covered portion 415' from edge to edge. The portable electronic device may be placed within the portable electronic device cover 400 (e.g., into the cavity 418) via an existing opening such as, for example, the first opening 404 or the second opening 406.

FIG. 4G is a perspective view of the portable electronic device cover 400 having a portable electronic device 420 contained therein. The perspective view illustrated in FIG. 4G is the same as the electronic device cover 400 illustrated in FIG. 4A. Additionally, in FIG. 4G, the portable electronic device cover 400 is placed over (e.g., encloses) the portable electronic device 420. When the portable electronic device cover 400 is placed around the portable electronic device 420, the electrical connector 402 can be mechanically and electrically connected to the external connection port of the portable electronic device 420. Consequently, the electrical connector 402 provided within the portable electronic device cover 400 serves to enable one or more electrical components associated with the portable electronic device cover 400 to electrically coupled to electrical circuitry within the portable electronic device 420.

In an alternative embodiment, the first opening 404 and/or the second opening 406 can contain a material. In one implementation, the material can be a thinner layer of material than that used for the portable electronic device cover 400. In another implementation, the material can be substantially or completely translucent. In still another implementation, the material can have depressions or features. For example, the depressions or features can assist with user input.

FIGS. 5A-5D are partial side elevation views of a portable electronic device cover 500 according to several embodiments of the invention. The portable electronic device cover 500 may, for example, generally correspond to those previously mentioned covers or electronic covers. In each of these figures the electronic components 502 are at least partially embedded or formed into a portion of the cover body 504. Put another way, the electrical components 502 are at least integral with the cover body 504 (e.g., integrated). The electrical components 502 may be selected from any of those described previously and although only a single component is shown, it should be appreciated that the techniques described may apply to multiple components. Furthermore, when dealing with multiple components, any combination of FIGS. 5A-5H may be used. In all of these combinations it can be said that the electrical components share a common cover body. It should also be appreciated that the electrical components can be on the same or different walls of the cover body. For example, electrical components can be placed relative to front walls, rear walls, side walls, top walls and/or bottom walls using one or a combination of the embodiments described with reference to FIGS. 5A-5D.

Figure 5A:
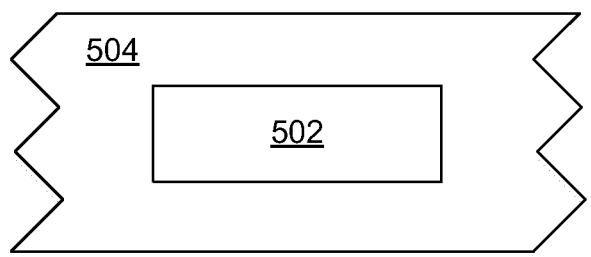
FIGS. 5A-5D are partial side elevation views of a portable electronic device cover according to several embodiments of the invention.

FIG. 5A shows the electrical component 502 completely disposed within the cover body 504 (e.g., enclosed internally). The electrical component 502 may, for example, be embedded in the cover body 504. In one example, the cover body 504 is formed or molded around the electrical component 502.

Figure 5B:
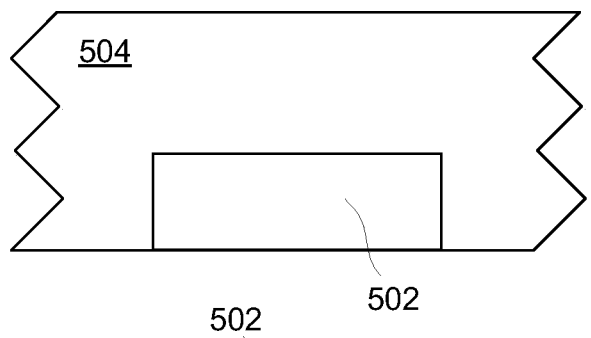

FIG. 5B shows the electrical component 502 disposed within the cover body 504, but partially exposed at the inside surface (may be protruding, recessed or flush). In some cases, the electrical component 502 can be recessed or flush with the inside surface to prevent contact with the portable electronic device. In some cases, as for example, where contact is desired (electrical contact), the electrical component 502 may protrude.

Figure 5C:
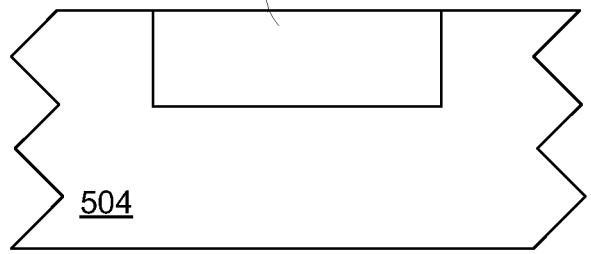

FIG. 5C shows the electrical component 502 disposed within the cover body 504, but partially exposed at the outside surface (may be protruding, recessed or flush). In some cases, the electrical component 502 can be recessed or flush with the outside surface to prevent contact with the portable electronic device. In some cases, as for example, where contact is desired (electrical contact), the electrical component 502 may protrude.

Figure 5D:
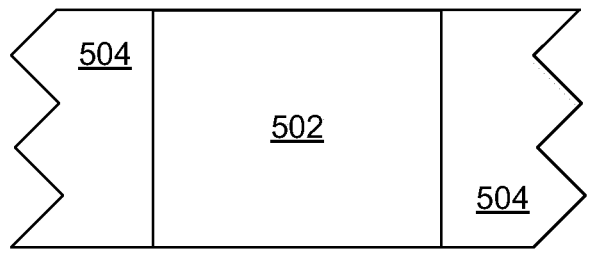

FIG. 5D shows the electrical component 502 disposed within the cover body 504, but partially exposed at the inside and outside surfaces (may be protruding, recessed and/or flush on each side).

The cover body 504 shown in FIGS. 5A-5D can be formed from multiple layers. For example, the multiple layers can include an external member and an internal member. The electrical component 502 may be sandwiched between, disposed within one of the members, and/or partially disposed within both members. These layers may be attached or integrally formed (e.g., double shot).

In accordance with one embodiment, the body shown in FIGS. 5A-5D may be formed from a soft, flexible and/or compliant material that can be wrapped around the various surfaces of the portable electronic device. For example, the material may allow the covering to stretch over the portable electronic device (e.g., form fitting). By way of example, the outer covering may be formed from a stretchable material that includes a small opening that can be stretched to accommodate the larger portable electronic device as it is inserted into the outer covering. Once the portable electronic device is inserted, the material confirms to the shape of the portable electronic device, which provides a tight fit around the surfaces of the portable electronic device. The outer covering may, for example, surround multiple side surfaces if not all of the side surfaces of the portable electronic device. In one particular example, the material may be rubber or silicone materials. These type of coverings are sometimes referred to as "skins" as they create a new outer layer analogous to skin. It should be appreciated however that other materials may be used.

Figure 6A:
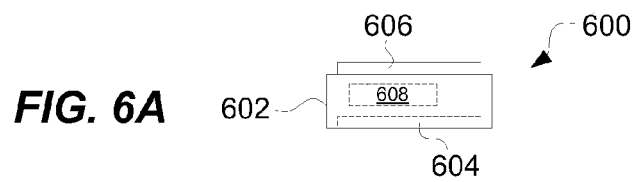
FIG. 6A-6D are diagrammatic illustrations of a portable electronic device cover according to one embodiment of the invention.

FIG. 6A-6D are diagrammatic illustrations of a portable electronic device cover according to one embodiment of the invention. In this embodiment, the electrical connector 600 includes an external and internal mating region as well as other operational components. FIG. 6A is a top view of an electrical connector 600. The electrical connector 600 includes a connector body 602. The connector body 602 includes a receptacle 604 (e.g., female portion) and an extension 606 (e.g., male portion). The receptacle 604 is electrically connected to the extension 606. The receptacle 604 can receive a counterpart extension and the extension 606 can connect to a counterpart receptacle. The electrical connector 600 can also include at least one electrical component 608 embedded in the connector body 602.

Figure 6B:
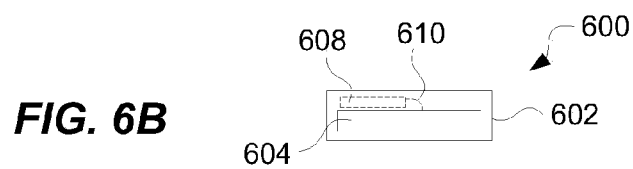

FIG. 6B is a side view of the electrical connector 600 illustrated in FIG. 6A. The at least one electrical component 608 is shown embedded in the connector body 602. One or more wires 610 can also be provided internal to the connector body 602 to connect the at least one electrical component 608 to the receptacle 604 and the extension 606. The electrical connector 600 can pertain to a peripheral connector. Typically, the electrical connector 600 will have a plurality of electrical contacts (e.g., pins). The electrical connector 600 can be embodiment is various ways, such as a flat multi-pin connector (e.g., 30-pin connector), a plug with multiple electrical contact regions, or a peripheral bus connector (e.g., USB or Firewire™).

Figure 6C:
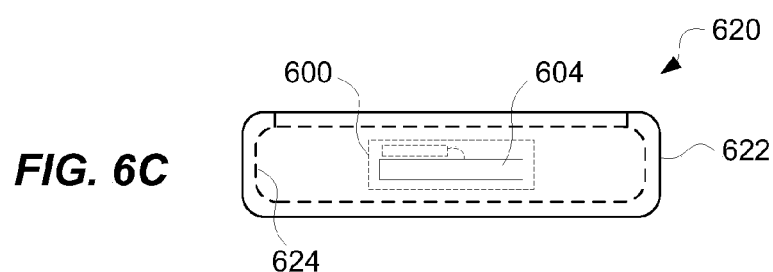

FIG. 6C is an end view of a portable electronic device cover 620 according to one embodiment of the invention. The portable electronic device cover 620 has an outer surface 622 and an inner surface 624. Internal to the inner surface 624 is a cavity configured to receive a portable electronic device. The electrical connector 600 is shown as being provided within the portable electronic device cover 620. As shown in FIG. 6C, the receptacle 604 can be accessible from the end of the portable electronic device cover 620. The extension 606 of the electrical connector 600 is also accessible internal to the cavity so that connection with a counterpart connector of the portable electronic device can be made.

Figure 6D:
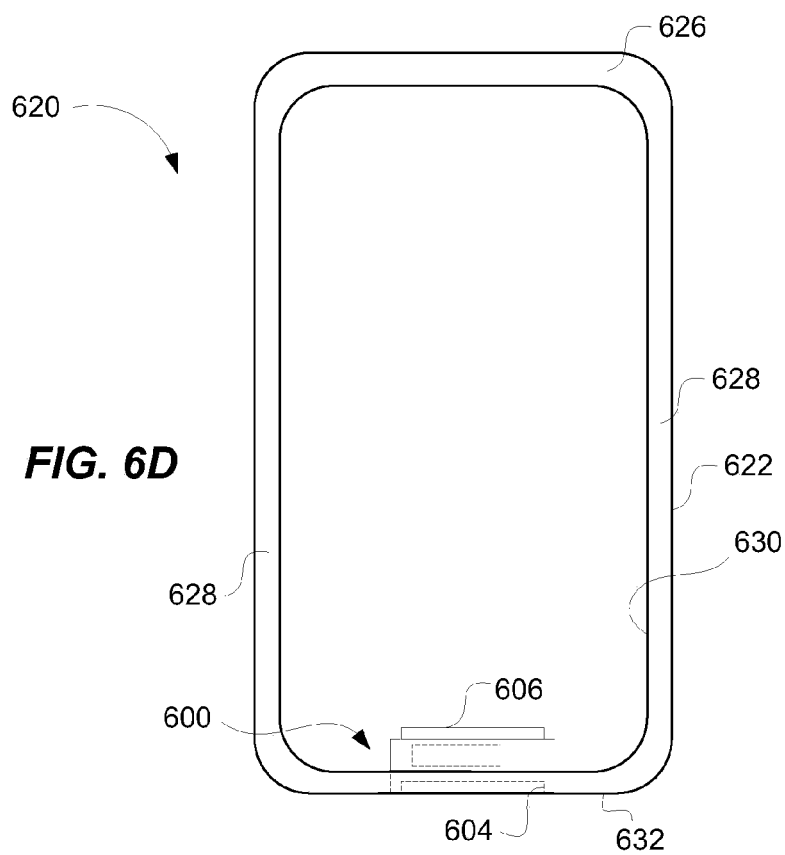

FIG. 6D illustrates a rear surface 626 for the portable electronic device cover 620 according to one embodiment of the invention. In this embodiment, the rear surface 626 of the portable electronic device cover 620 has a band portion 628 of the portable electronic device cover 620 that extends around the periphery of the rear surface 626. In this embodiment, the rear surface 626 has a large opening 630 given that the band portion 628 extends inward from the edge of the periphery to a minimum extent. The opening 630 allows the portable electronic device to be inserted into the portable electronic device cover 620 and connected with the extension 606 of the electrical connector 600. The electrical connector 602 is at least partially embedded at an end 632 of the portable electronic device cover 620. In other embodiments, the rear surface 626 of the portable electronic device cover 620 can alternatively be embodied as illustrated in any of FIG. 4C, 4E or 4F.

Figure 7:
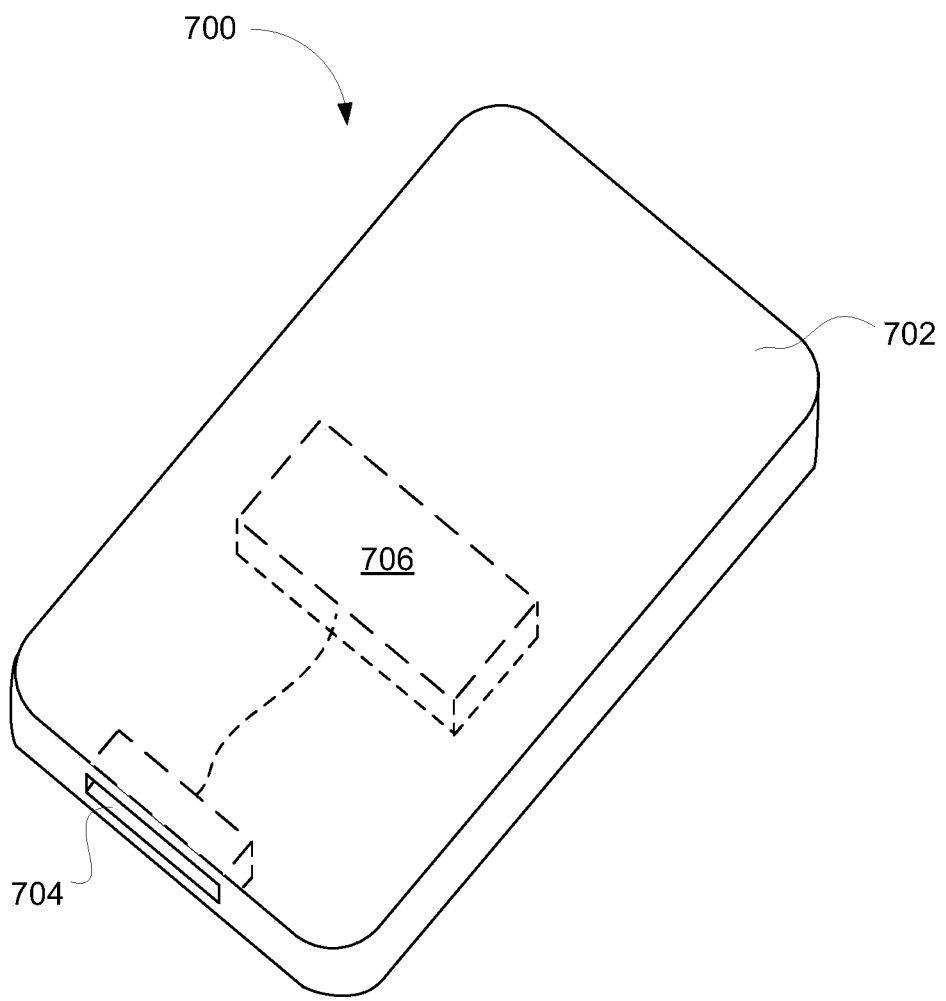
FIG. 7 is a perspective diagram showing a portable device cover in accordance with one embodiment of the invention.

FIG. 7 is a perspective diagram showing a portable device cover 700 in accordance with one embodiment of the invention. The portable device cover 700 can be similar to that shown in FIGS. 2, 3, 4A-4G and 6A-6D. The portable device cover 700 includes a cover body 702. Besides including a connector 704, the cover body 702 also includes at least one electrical component 706 positioned within the portable device cover 700. While the connector 704 may be found in a first wall of the cover body 702, the electrical component 706 may be found in a second wall. By way of example, the connector 704 may be disposed in a bottom wall while the electrical component 706 may be found in front, rear, top and/or side walls. The electrical component 706 may be operatively coupled to the connector 704 so as to allow communications and/or signaling to occur between the electrical component 706 and the portable electronic device when inserted into the portable device cover 700. This may be accomplished using a variety of techniques including but not limited to wires, traces, flex circuits, rigid flex, circuit boards and/or the like. Any combination of elements may be used. These lines may be configured into the portable device cover 700 similar to that of the electrical components 706, such as discussed in FIG. 5A-5D.

Figure 8:
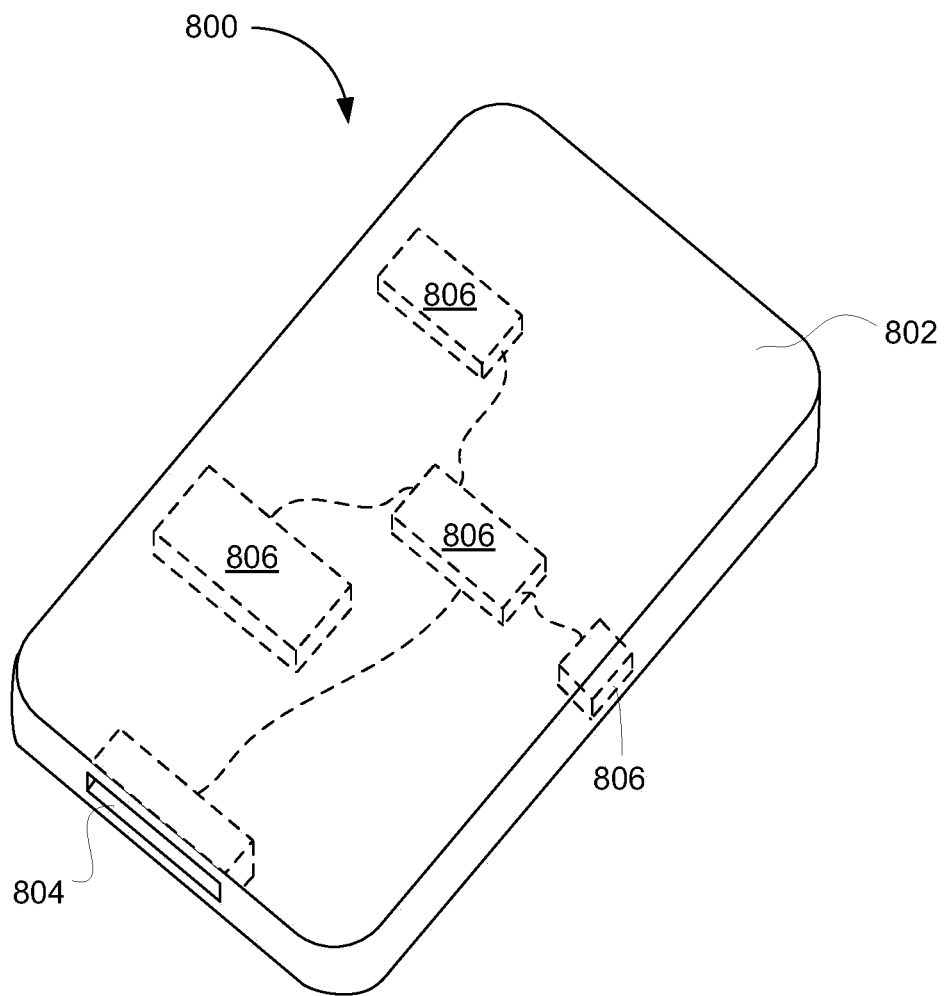
FIG. 8 is a perspective diagram showing a portable device cover in accordance with one embodiment of the invention.

FIG. 8 is a perspective diagram showing a portable device cover 800 in accordance with one embodiment of the invention. The portable device cover 800 can be similar to that shown in FIGS. 2, 3, 4A-4G and 6A-6D. The portable device cover 800 includes a cover body 802. Besides including a connector 804, the cover body 802 also includes at least one electrical component 806 positioned at one or more locations of the portable device cover 800. In FIG. 8, the portable device cover 800 includes a plurality of electrical components 806. The electrical components 86 provided within the portable device cover 800 can include can be electrically interconnected as well as connected to the connector 804. While the connector 804 may be found in a first wall of the cover body 802, the electrical components 806 may be found in any of one or more of the walls of the cover body 802. By way of example, the connector 804 may be disposed in a bottom wall while the electrical components 806 may be found in front, rear, top and/or side walls. In this embodiment, the portable device cover 800 includes multiple and discrete electrical components 806 positioned at different locations about the cover body 802. For example, a first electrical component may be found in a first wall and a second electrical component may be found in the same wall but at different location or may be found on a different wall altogether. By way of example, as shown in FIG. 8, a bottom wall includes the connector 804, a front wall includes a first, second and third electrical components 806, and a side wall includes a fourth electrical component 806. The electrical components 806 may be operatively coupled (i.e., directly or indirectly connected) to the connector 804 so as to allow communications and/or signaling to occur between the electrical components 806 and the portable electronic device when inserted into the portable device cover 800. This may be accomplished using a variety of techniques including but not limited to wires, traces, flex circuits, rigid flex, circuit boards and/or the like. Any combination of elements may be used. These lines may be configured into the portable device cover 800 similar to that of the electrical components 806, such as discussed in FIG. 5A-5D.

It should be appreciated that although a connector is provided in the embodiments shown in FIGS. 7 and 8, there are alternative ways besides the connector for electrical components within a cover body of a portable device cover to communicate with a portable electronic device provided within the portable device cover. For example, as mentioned earlier, wireless connections may also be used. In some cases, some of the electrical components within the cover body can communicate through a connector while others communicate wirelessly. Alternatively or additionally, the portable device cover may include multiple connectors.

Figure 9A:
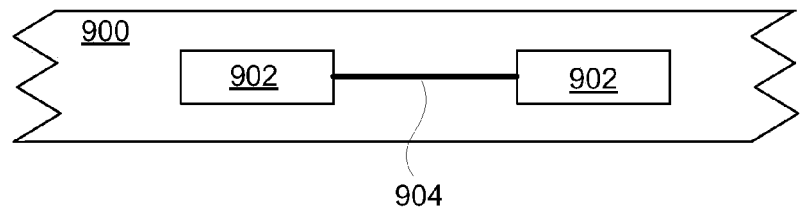
FIGS. 9A, 9B and 9C show operative coupling between multiple electrical components in accordance with certain embodiments of a portable device cover.
Figure 9B:
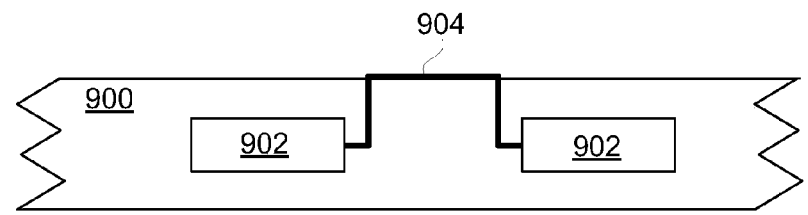
Figure 9C:
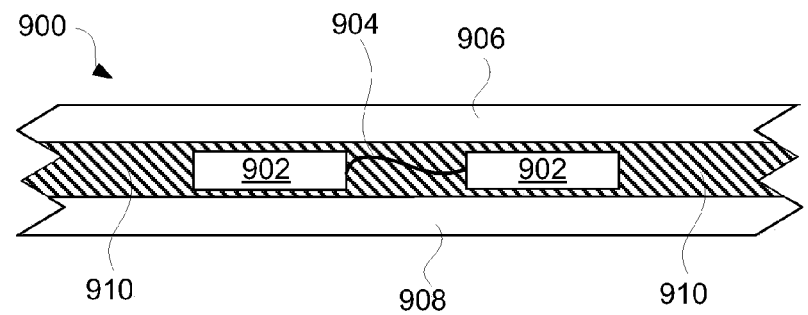

The electrical interconnections or routing between electrical components (including connectors) can vary with implementation and can depend on the desired configuration of the cover and portable electronic device. FIGS. 9A, 9B and 9C show operative coupling between multiple electrical components in accordance with certain embodiments of a portable device cover 900. As shown in FIG. 9A, the electrical components 902 may be embedded in the cover 900 and interconnected with electrical leads, wires or traces 904 also within the cover. As shown in FIG. 9B, the electrical components 902 may be embedded in the cover 900 but be operatively coupled via leads, wires or traces 904 that are at least partially outside the cover 900. In some cases, there may be an insulation layer provided within a wall of the cover 900. As shown in FIG. 9C, an intermediate layer 910 may be disposed between an inner layer 906 and an outer layer 908 of a wall. The intermediate layer 910 can be an insulative or filler material. The intermediate layer 910 can thus surround and support the electrical components 902 and the electrical leads, wires or traces 904 placed in between the inner layer 906 and the outer layer 908.

Figure 10A:
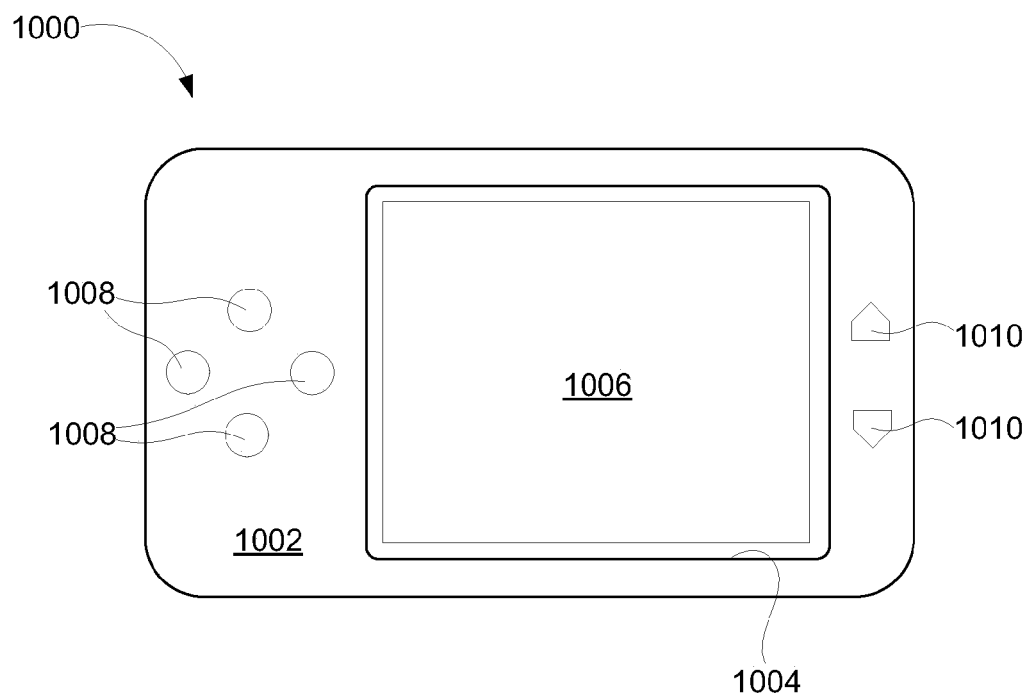
FIG. 10A is a top view of a covered portable electronic device according to one embodiment of the invention.

FIG. 10A is a top view of a covered portable electronic device 1000 according to one embodiment of the invention. The covered portable electronic device 1000 has a cover 1002. The cover 1002 provides user input devices that can be used to interact with the covered portable electronic device 1000. The cover 1002 also includes an opening 1004. The opening 1004 allows a screen 1006 of the portable electronic device being covered by the cover 1002 to be exposed. The user input devices being provided by the cover 1002 can vary depending upon implementation. As illustrated in FIG. 10A, the user input devices can include a set of buttons 1008 on one side of the top surface of the cover 1002, and can include a set of buttons 1010 on the opposite side of the top surface of the cover 1002. As an example, the cover 1002 can serve to provide game player user interface to the portable electronic device being covered. The top surface of the cover 1002 covers the top surface of the portable electronic device. However, in an alternative embodiment, the top surface of the cover 1002 can cover the rear surface of the portable electronic device.

Figure 10B:
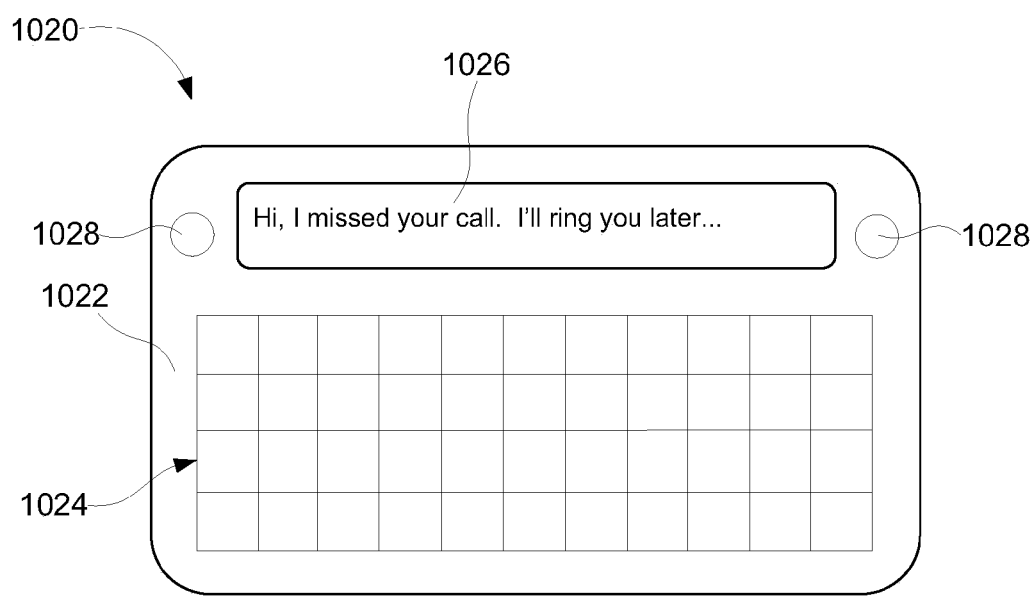
FIG. 10B is a view of a covered portable electronic device according to one embodiment of the invention.

FIG. 10B is a view of a covered portable electronic device 1020 according to one embodiment of the invention. The covered portable electronic device 1020 has a cover 1022. The cover 1022 shown in FIG. 10B can cover either a top surface or a rear surface of the portable electronic device being covered. The cover 1022 includes a keypad region 1024 that provides a plurality of key areas that allow a user of the portable electronic device to enter alphanumeric characters. The cover 1022 can also include a display screen 1026. The display screen 1026 can be provided by the cover 1022 (or by the portable electronic device being covered). The display screen 1026 can display alphanumeric characters that are input using the keypad region 1024. The cover 1022 can also provide one or more buttons 1028 to support other functions with respect to the covered portable electronic device 1020. The cover 1022 can include a flexible circuit to provide the sensors for keys provided in the keypad region. For example, the cover 1022 can facilitate text entry with respect to the covered portable electronic device 1020.

Figure 10C:
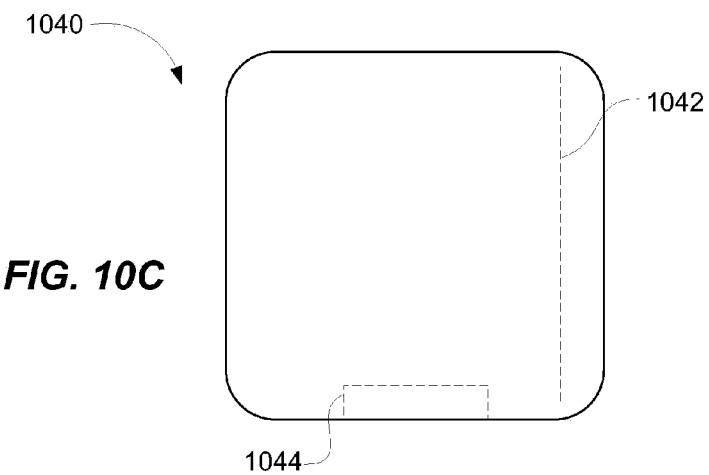
FIG. 10C is a view of a cover for a portable electronic device according to one embodiment of the invention.

FIG. 10C is a view of a cover 1040 for a portable electronic device according to one embodiment of the invention. The cover 1040 has an antenna 1042 internal to the cover 1040. In one embodiment, the antenna 1042 is completely embedded in the cover 1040. The antenna 1042 can be connected to a connector 1044. The connector 1044 can be used to electrically connect the antenna 1042 to electrical circuitry of the portable electronic device. The antenna 1042 can serve to provide the portable electronic device with a supplementary or alternative antenna. The antenna 1042 can be designed for wireless reception for one or more particular networks. The cover 1040 can also include more than one antenna, each of which can be of different types or designed for different networks or frequencies.

Figure 10D:
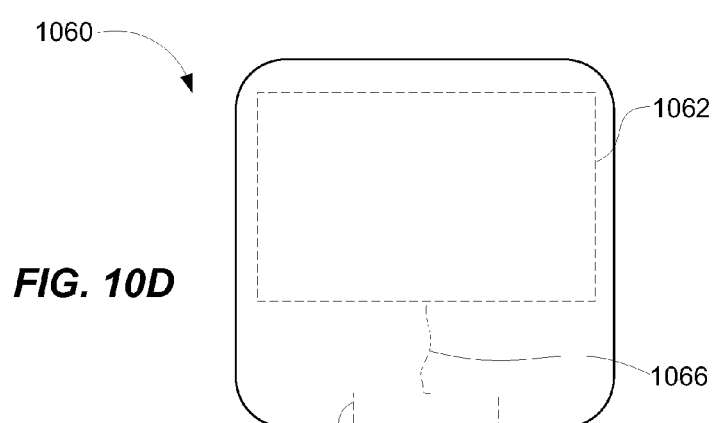
FIG. 10D is a view of a cover for a portable electronic device according to one embodiment of the invention.

FIG. 10D is a view of a cover 1060 for a portable electronic device according to one embodiment of the invention. The cover 1060 has an electronic grid 1062 internal to the cover 1060. The electronic grid 1062 can pertain to various different electronic structures, such as a grid of photovoltaic elements to capture solar energy or a grid of illumination elements (e.g., LEDs). The solar energy can be used to charge a battery or power the portable electronic device. The illumination elements can be controlled to produce an ornamental appearance for the cover 1060. For example, the illumination devices can be used to impart different colors to different parts of the cover 1060 so as to colorize the cover 1060, display an image, or display light effects. Fiber optics (e.g., fiber optic strands) can also be used within the cover 1060 to route light for illumination purposes. The material used for the cover 1060 can also be used to diffuse the light produced by the illumination elements. In one embodiment, the electronic grid 1062 is completely embedded in the cover 1060. The electronic grid 1062 can be connected to a connector 1064 by electrical conductors (e.g., wires). The connector 1064 can be used to electrically connect the electronic grid 1062 to electrical circuitry of the portable electronic device.

Figure 10E:
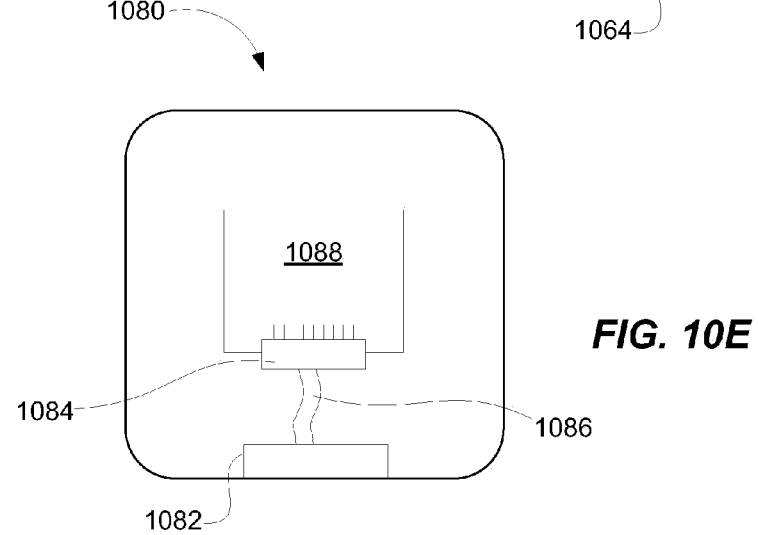
FIG. 10E is an internal top view of a cover for a portable electronic device according to one embodiment of the invention.

FIG. 10E is an internal top view of a cover 1080 for a portable electronic device according to one embodiment of the invention. When the cover 1080 is placed on the portable electronic device, the internal region of the cover 1080 is adjacent to the portable electronic device. The cover 1080 includes an electrical connector 1082 that is partially exposed at the internal region so that the electrical connector 1082 can be connected to a counterpart connector of the portable electronic device. The cover 1080 also includes a component connector 1084 that is electrically connected to the electrical connector 1082 by a cable 1086. Adjacent the component connector 1084 is a recess 1088. The recess 1088 is for receiving an electrical component that can be connected to the cover 1080 by way of the component connector 1084.

FIGS. 11A-11D illustrate an interconnection system for a portable electronic device 1100 and a cover 1102 according to one embodiment. The portable electronic device 1100 includes one or more recessed contacts 1104. The recessed contacts 1104 can be provided on an surface of the housing of the portable electronic device 1100. For example, in one embodiment, the recessed contacts 1104, namely conductive metal contacts, are provided on a back surface of the portable electronic device 1100. FIG. 11A illustrates a back view for the portable electronic device 1100, and FIG. 11C illustrates a side view for the portable electronic device

1100. FIG. 1102 illustrates a surface of the cover 1102, and FIG. 11D illustrates a side view for the cover 1102. The cover 1102 for use with the portable electronic device 1100 can be provided with one or more exposed contacts 1106. The exposed contacts 1106 can be provided on an inner surface of the cover 1102 that abuts against the surface of the portable electronic device 1100 having the recessed contacts 1104 when the cover 1102 is provided on the portable electronic device 1100. The exposed contacts 1106 can be protruding outward from the inner surface of the cover 1102 so as to engage and make electrical contact with the recessed contacts 1104. The exposed contacts 1106 can be shaped or biased so provide a reliable electrical connection with the recessed contacts 1104. The exposed contacts 1106 can be formed from conductive metal.

In the embodiment illustrated in FIGS. 11A-11D, the recessed contacts 1104 are a set of aligned and spaced apart contact pads having a bar-shaped configuration. The exposed contacts 1106 can have a similar configuration and may be biased to ensure proper contact when mating with the corresponding recessed contacts 1104. This may, for example, be accomplished with flexure or spring-like contacts. Alternatively, the exposed contacts 1106 of the cover 1102 may be positioned on a flexible bump of the under surface. The flexible bump may, for example, be an integrally molded portion of the cover 1102. It should be appreciated that the cover 1102 may include an alignment feature to ensure proper contact. In some cases, the alignment feature may simply be multiple surfaces of the cover, i.e., the multiple surfaces self-align the contacts when the covering and portable electronic device are mated.

The various electrical components may be individually situated relative to the cover or they may be grouped and placed on a carrier (or substrate), such as a circuit board.

In one embodiment, the cover can includes one or more electronic subassemblies that are embedded with the cover. A subassembly is a multi-part electronic component, such as a electronic circuit, integrated circuit or substrate (e.g., PCB, flex circuit). The cover may, for example, be formed from a rubber or silicone material. The electronic subassemblies may be embedded within the cover using for example insert molding techniques. Although the electronic subassemblies are embedded, at least a contact portion can be exposed so that the subassemblies can be interconnected. For example, the subassemblies and controller may include a series of exposed pads or pins. In one particular embodiment, the subassemblies are externally connected through wires, flex circuits or traces that run along an exposed surface of the covering. For example, the connections can be provided by traces that are printed on the exposed surface of the cover. The traces may subsequently be covered with a dielectric coating to provide protection and/or electrical isolation. The subassemblies may be formed in a variety of ways and include a variety of electronic components. In one example, a subassembly can include a controller which can pertain to a controller or processor chip, individually or mounted on a substrate, such as a printed circuit board. The controller may also include a connector that is integrated therewith, such as attached to the same substrate.

In another embodiment, the subassemblies as well as the wires, flex circuits or traces are all embedded within the cover. In one implementation, the subassemblies and their interconnections can be established before being embedded within the cover. To implement this embodiment, the subassemblies and interconnections (e.g., wires, traces or flexible circuits) can, for example, be mounted on a substrate, such as a flex circuit, rigid flex or PCB.

FIG. 12A is a diagram of a cover 1200 for a portable electronic device according to one embodiment. The cover 1200 includes a connector 1202 that enables the cover 1200 to electrically connect with the portable electronic device. The cover 1200 can contain or support a plurality of distinct electrical components 1204, 1206 and 1208. In general, although all of the components 1204, 1206 and 1208 are electrically connected, directly or indirectly, to the connector 1202. However, in one embodiment as shown in FIG. 12A, the electrical component 1204 is connected to the connector 1202, the electrical component 1206 is connected to the electrical component 1204 via conductors 1210, and the electrical component 1208 is connected to the electrical component 1208 via conductors 1212. The electrical components 1204, 1206 and 1208 can, for example, pertain to integrated circuits, electronic circuits, sensors, electronic devices (display, touch sensitive devices, user input devices, etc.), or substrates (printed circuit boards, rigid or flexible). The electrical components 1204, 1206 and 1208 as well as the conductors 1210 and 1212 can be provided internal to the cover 1200 or can be provided on an inner surface of the cover. For internal placement, the electrical components and/or conductors can be formed in the cover when the cover is molded. For surface placement, the electrical components and/or conductors can be adhered to the inner surface of the cover.

FIGS. 12B and 12C are diagrams of a cover 1220 for a portable electronic device according to one embodiment. FIG. 12B illustrates a front view of the cover 1200, and FIG. 12C illustrated a side view of the cover 1200. The cover 1220 includes a connector 1222 that enables the cover 1220 to electrically connect with the portable electronic device. Internal to the cover 1220 is a substrate 1224 electrically connected to the connector 1222. The substrate 1224 has a plurality of electrical components 1226 attached. The substrate 1224 is, for example, a flexible substrate, such as a film or flex circuit. The electrical components 1226 can represent various distinct electrical components. The electrical components 1226 can, for example, pertain to integrated circuits, electronic circuits, sensors, electronic devices (display, touch sensitive devices, user input devices, etc.), or substrates.

In one embodiment, the carrier (or substrate) is flexible especially in embodiments where the covering is flexible and/or compliant. In addition, flexible and compliant embodiments may space the electrical components such that the body remains flexible and/or compliant. This may for example be accomplished as discrete components attached through traces or wires or via a flex circuit. If the components are too closely spaced they may make the body somewhat rigid thereby making it difficult to stretch or conform to a surface of the portable electronic device.

In one embodiment, traces for routing the various components about the cover are provided on the internal surface of the cover. By way of example, they may be applied as a coating that is deposited or painted in the desired pattern. In one implementation, the components are molded into the cover with contacts left exposed on the internal surface. Thereafter, the traces are applied to the internal surface to connect the various components. By way of example, the traces may provide connections between a controller and various Input/Output (I/O) features and between the controller and a connector. Alternatively or additionally, the traces may provide direct connections between the I/O features and the connector. In one embodiment, a compliant cover is molded with electrical components and thereafter it is folded inside out so that the traces can be applied to the internal surface. In some cases, a cover layer (e.g., dielectric layer) may be applied over the traces to protect and/or electrically isolate the traces. By way of example, a dielectric coating may be applied over the traces (similar pattern) or it may cover a majority of the surface thereby ensuring that the traces are covered.

In one embodiment, the cover may include one or more openings for providing access to a feature of the portable electronic device when the portable electronic device is being surrounded by the cover. One such opening may, for example, provide for a access to a display or an input mechanism (such as a navigation pad, touch pad, buttons, and the like). In the case of a display opening, the cover may also include a window of transparent material disposed within the opening. The transparent material may be plastic or glass. The window may, for example, be insert molded within the cover or otherwise attached to the cover. The window may include a touch surface such as a touch screen. Any such electrical components in the cover can be coupled to a connector carried by the cover so that it can communicate with portable electronic device.

FIGS. 13A and 13B are diagrams of a cover 1300 for a portable electronic device according to one embodiment. FIG. 13A illustrates a front view of the cover 1300, and FIG. 13B illustrated a side view of the cover 1300. The cover 1300 include an opening 1302 that permits access to a touch screen, display or input region of the portable electronic device. The cover 1300 includes a display 1304. In this embodiment, the display 1304 is provided adjacent the opening 1302. However, in general, the display 1304 can be provided at any position on the cover 1300. The cover 1300 can further include a connector 1306 to facilitate connection with the portable electronic device.

In one embodiment, a cover may also include a display bezel disposed around one or more edges of an opening in the cover. The display bezel may include one or more display components, such as LEDs, LCDs and/or other light sources. The display bezel may also include a variety of optical components such as diffusers, light guides, light pipes for distributing light from a light source to the display bezel for illumination thereof. This type of system may be used to extend the feel of a primary display of the portable electronic device. The display bezel may be connected to a connector in the cover so that it can connect to portable electronic device. In one embodiment, the display bezel includes a series of discrete light elements disposed around the opening.

In another embodiment, the cover can include at least one light source that can provide visual affects to the cover. The visual effect can be ornamental or aesthetic in nature. Alternatively or additionally, the visual effect can be indicative of functional operation of the portable electronic device. For example, the functional operation can pertain to operation of a software program operating on the portable electronic device. As another example, the functional operation can provide a status of the portable electronic device (e.g., indicator light).

FIG. 14A is a front view of a cover 1400 for a portable electronic device according to one embodiment. The cover 1400 include an opening 1402 that permits access to a touch screen, display or input region of the portable electronic device. The cover 1400 includes a bezel display 1404. In this embodiment, the display 1404 is provided around all of the edges of the opening 1402 (i.e., surrounds the opening 1402). The cover 1400 can further include a connector 1406 to facilitate connection with the portable electronic device.

According to another embodiment, a cover for a portable electronic device can include integrated ear phones. For example, the cover may include a connector that is capable of coupling to the portable electronic device to receive audio signals from the portable electronic device, and a wire/cable that extends from the cover to a pair of earphones/speakers. In some cases, the wire/cable may be retractable and the cover may include a retention mechanism or space for holding the earphones.

In another embodiment, a cover can include a standardized attachment area for receiving various accoutrements, which can be functional and/or ornamental. With regards to functional, the covering may include electrical contacts while for ornamental, the covering may include detents, snaps, latches for grabbing a structure such as a chrome faring.

FIG. 14B is a side view of a cover 1450 for a portable electronic device according to one embodiment. The cover 1450 includes one or more attachment regions 1452 that are provided on the outer surface of the cover 1450. The attachment regions 1452 can permit attachment of various other structures to the cover 1450. The cover 1450 can additionally or alternatively include a connector 1454 for coupling to the portable electronic device and another connector 1456 coupled to the connector 1454. As one example, the connector 1454 can be a different connector than the connector 1456, thereby enabling the cover 1450 to serve as an adapter. For example, the connector 1456 can be a memory card slot, a USB or Firewire port, a power receptacle, etc.

In one embodiment, a cover may include a variety of tactile features that help define input areas for specific applications of a portable electronic device. The tactile features may further include features for helping perform inputs. These features may include embedded actuators such as switches or embedded features, such as metal billets that help provide capacitance sensing through the covering.

FIGS. 15A-15F are side views of a portable electronic device according to various different embodiments. These embodiments can be use separately or in combination to provide a cover with certain features.

Figure 15A:
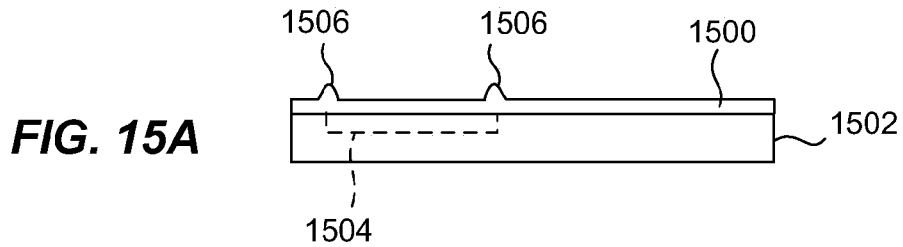
FIGS. 15A-15F are side views of a portable electronic device according to various different embodiments.

FIG. 15A is a diagram of a cover 1500 for a portable electronic device 1502 according to one embodiment. The portable electronic device 1502 includes a user input area 1504 and the cover 1500 provides tactile features 1506 on its outer surface to denote the user input area 1504 for the user.

Figure 15B:
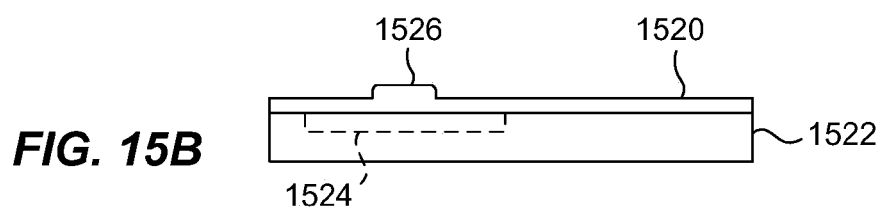

FIG. 15B is a diagram of a cover 1520 for a portable electronic device 1522 according to one embodiment. The portable electronic device 1522 includes a user input area 1524 and the cover 1520 provides one or more tactile features 1526 on its outer surface to denote one or more user input buttons over the user input area 1524. The user input buttons can server as switches, keys or other user selections.

Figure 15C:
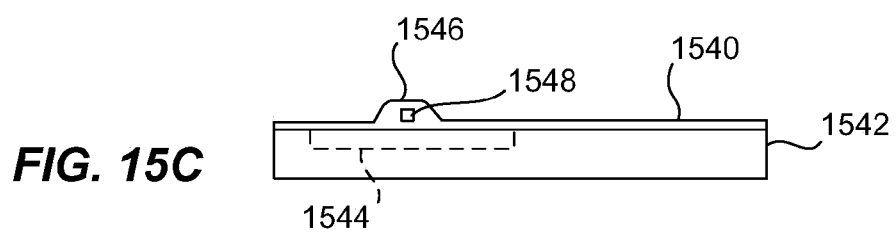

FIG. 15C is a diagram of a cover 1540 for a portable electronic device 1542 according to one embodiment. The portable electronic device 1542 includes a user input area 1544 and the cover 1540 provides one or more tactile features 1546 on its outer surface to denote one or more user input buttons over the user input area 1544. The user input buttons can server as switches, keys or other user selections. Below the tactile features 1546, the cover 1540 can include embedded rigid feature 1548 that facilitate use input. The embedded rigid features can serve to direct or concentrate user input onto the user input area 1544 of the portable electronic device 1542, or can serve to enhance capacitive input detection in the case where the user input area 1544 is a capacitive touch sensitive surface.

In one embodiment, a cover is formed from a compliant material such as silicone rubber (silicon rubber). The cover can include one or more force sensors embedded within the cover or applied to an inside surface of the covering. The one or more force sensors can be configured to measure or detect force being applied thereto through deformations in the compliant material of the cover. The area around the force sensor may further include tactile features that help define the location of an input area. The tactile features may, for example, be ridges that surround the border of the sensor.

Figure 15D:
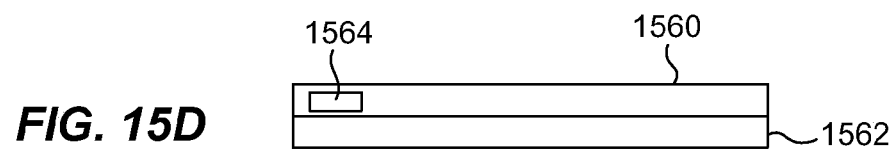

FIG. 15D is a diagram of a cover 1560 for a portable electronic device 1562 according to one embodiment. The cover 1560 include one or more embedded force sensors 1564. Typically, the cover 1560 is compliant or deformable in this embodiment. The embedded force sensors 1564 can be used to detect user inputs, for example, when a user presses on the cover 1560 above one of the embedded force sensors 1564. The detected user input can be electrically coupled to other electrical components of the cover 1560 or the portable electronic device 1562.

In one embodiment, a cover can include a switch, such as a tactile switch or dome switch, that can be embedded within the cover or be applied to an inside surface of the covering. The switch may include an actuator that when depressed provides an input signal. For example, when forces are applied via a press input, such forces are transferred through the cover to the actuator of the switch thereby creating an input signal. The switch can abut against a surface of the portable electronic device. Optionally, the region of the switch may include tactile features that help define the location of an input area of the switch within the cover. The tactile features may, for example, be a bump that helps define a button on the outer surface of the switch region.

Figure 15E:
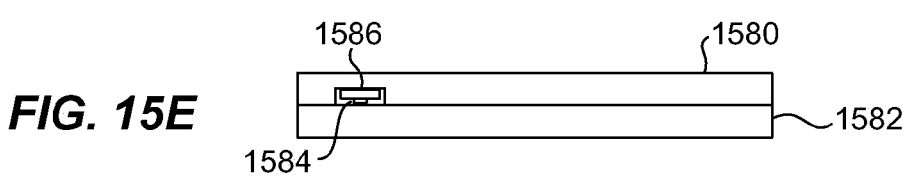

FIG. 15E is a diagram of a cover 1580 for a portable electronic device 1582 according to one embodiment. The cover 1580 includes at least one switch 1584. The switch 1584 can be provided in a recess 1586 of an inner surface of the cover 1580. Typically, the cover 1580 is compliant or deformable in this embodiment. When a user presses on the cover 1580 above the switch 1584, the switch 1584 is activated such that the switch input is received. The switch input can be electrically coupled to other electrical components of the cover 1580 or the portable electronic device 1582.

In one embodiment, an electronic component is partially embedded in an outer surface of a cover. The electronic component may, for example, be an input device such as a mechanical navigation pad module, a touch pad module, a keypad module or a joy stick module. In one implementation, the embedded electronic component is removable from the cover. If attached, the embedded electronic component is able to couple to other electronics of the cover or portable electronic device. The embedded electronic component can detachably couple to an embedded mating portion of the cover.

Figure 15F:
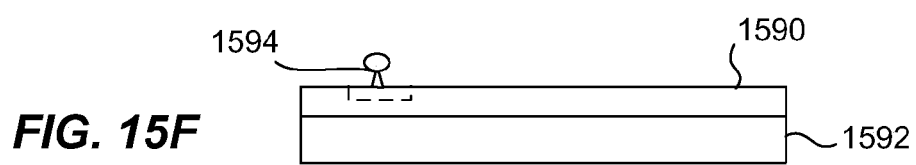

FIG. 15F is a diagram of a cover 1590 for a portable electronic device 1592 according to one embodiment. The cover 1590 includes a joy stick input device 1594. The joy stick input device 1594 can be provided such that it is exposed on an outer surface of the cover 1590. The joy stick input device 1594 can be electrically coupled to other electrical components of the cover 1590 or the portable electronic device 1592.

In one embodiment, multiple different types of covers can be placed around the same portable electronic device. The portable electronic device may, for example, include a display screen and a button on its front surface. The different types of covers may be specific to particular applications provided by the portable electronic device. The covers may include an opening for the display screen and an opening for the button. The covers may also provide additional buttons for the portable electronic device when it is coupled to the cover. The buttons may, for example, surround the opening for the button of the portable electronic device. The buttons may be tactile features (raised areas of the covering) that include an embedded switch or that interface with a touch surface of the portable electronic device. Instead of several discrete buttons, the covering may include a series of keys. In fact, the series of keys may be a keyboard such as a QWERTY keyboard. The series of keys may also relate to a telephone layout (e.g., numbers, *, #). The button of the portable electronic device may act as the enter button in these embodiments.

Figure 16A:
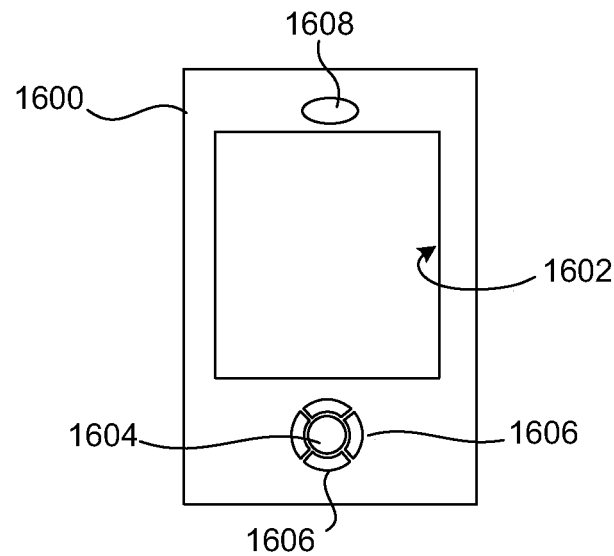
FIG. 16A is a front view of a cover for a portable electronic device according to one embodiment.

FIG. 16A is a front view of a cover 1600 for a portable electronic device according to one embodiment. The cover 1600 includes an opening 1602 for access to a display/touch screen of the portable electronic device, and an opening 1604 for access to a button of the portable electronic device. The cover 1600 can include a plurality of buttons 1606 that are provided around the opening 1604. The buttons 1606 permit the user to enter inputs to the portable electronic device. The buttons can be implemented by switches or sensors. The cover 1600 can also include another opening 1608 for access to another feature of the portable electronic device.

Figure 16B:
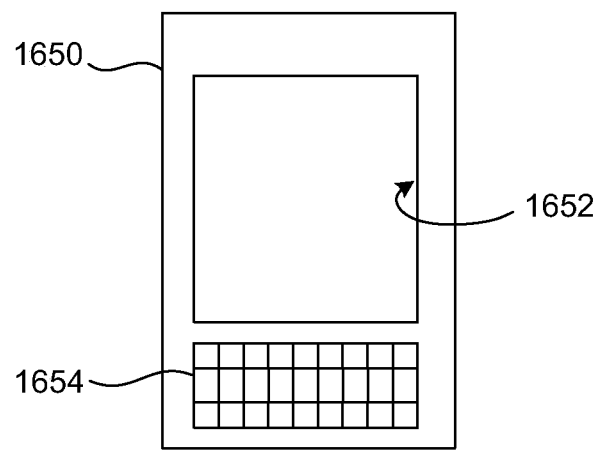
FIG. 16B is a front view of a cover for a portable electronic device according to one embodiment.

FIG. 16B is a front view of a cover 1650 for a portable electronic device according to one embodiment. The cover 1650 includes an opening 1652 for access to a display/touch screen of the portable electronic device. The cover 1650 can also include a keyboard 1654 having a plurality of keys. The cover 1650 this is able to transform a portable electronic device without a keyboard to a device that has a keyboard to receive alphanumeric input from a user.

In one embodiment, the cover includes one or more embedded electronic components. The electronic components can be selected from a wide variety of electronic components, including integrated circuits (chips), printed circuits, flex circuits, wires, traces, LEDs, sensors, switches, and the like. In one implementation, the electronic component has been molded inside a single layer of material. For example, an electronic component may be placed in a mold cavity for the covering and thereafter material may be made to flow around the electronic component and fill the cavity. Once hardened the material forms a covering with an embedded electronic component. In another implementation, the electronic component is sandwiched between two layers of material. The first layer may be formed and thereafter the electronic component can be placed in its desired location on the first layer (e.g., adhesive, printing, coating). Thereafter, a second layer may be applied to the first layer thereby trapping the electronic components between the first and second layers. The first and second layers may be formed from the same material, similar material with different characteristics or they may be formed from different materials entirely. In one example, the first and second layers can be formed from silicone rubber (silicon rubber). In another embodiment, the electronic component is partially embedded in a surface of the first layer and thereafter fully enclosed by the second layer being applied to the first layer.

In one embodiment, a cover can pertain to a phone cover. The phone cover is configured to add phone functionality when coupled to a portable electronic device that does not include phone functionality. The portable electronic device may, for example, be a portable media player, such as an IPod™ manufactured by Apple Inc. of Cupertino, Calif. The material for the phone cover be widely varied. In one embodiment, the material for the phone cover is a compliant, deformable or elastic and wraps around the portable electronic device. The phone cover may, for example, include an inner cavity that has an inner shape that substantially coincides with the outer shape of the portable electronic device when the phone cover is placed over the portable electronic device. The compliant skin can be formed from a variety of materials. In one embodiment, the phone cover is formed from silicon rubber.

The phone cover can include an opening or transparent window that provides viewable access to a display screen of the portable electronic device. The phone cover may also include an input area that at least designates a keypad region. The keypad region may include a keypad with integrated mechanical or electronic actuators or alternatively it may include visual and/or tactile elements that utilize an input device of the portable electronic device. In one example, the tactile elements are configured to engage an input device disposed on the portable electronic device. The input device may, for example, be a touch wheel/button found on some iPod devices. The keypad region generally includes number keys and # and * keys found on most phones. The keypad region may also include a talk or enter button. Other phone related buttons such as speaker and mute may also be provided. In one implementation, the keypad is arranged in a matrix or rows and columns. In another implementation, the keypad is arranged around a circle similar to old rotary telephones. The tactile features may be recesses or protrusions. In one example, the tactile features are depressible bumps.

The phone cover may include a connector for interfacing the electrical components within the portable electronic device. The phone cover can also include a built-in speaker and microphone. The speaker typically interfaces with the user's ear while the microphone typically interfaces with a user's mouth. Thus, the speaker is typically placed in an upper portion of the phone cover and the microphone in a lower portion of the cover.

Although not required, the phone cover may also include a proximity detector. The proximity detector may be used to detect when a user places the cover/electronic device up to their face. The phone cover can also include a speaker phone that allows audio data to be externally output. Still further, the phone cover can also include one or more of: a controller, an antenna, a camera, a connector, one or more switches, an opening for a power/hold switch, and an opening for an audio/video jack.

Figure 17A:
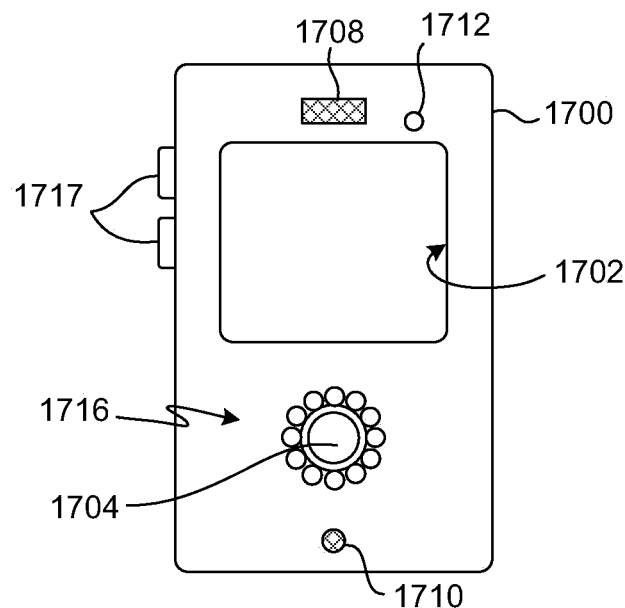
FIG. 17A is a diagram of a front surface of a cover for a portable electronic device according to one embodiment.

FIG. 17A is a diagram of a front surface of a cover 1700 for a portable electronic device according to one embodiment. The front surface of the cover 1700 is provided with various user interface components to adapt the portable electronic device to operate as a mobile telephone. The cover 1700 includes an opening 1702 for access to a display/touch screen of the portable electronic device, and an opening 1704 for access to a button of the portable electronic device. The cover 1700 can include a plurality of buttons 1706 that are provided around the opening 1704. The buttons 1706 permit the user to enter inputs to the portable electronic device. The buttons 1706 can be implemented by switches or sensors. Although various arrangements can be used, the buttons 1706 are arranged in a ring so as to resemble a rotary dial, with the buttons 1706 representing numbers 0-9. The cover can provide tactile features to denote each of the buttons 1706. The cover 1700 can also include a speaker 1708 and a microphone 1710. The cover 1700 can further include a proximity sensor 1712 to detect when the cover 1700 is held proximate to a user's head. Still further, the cover 1700 can include one or more switches 1714. Although placement can vary, the switches 1714 are provided on a side surface of the cover 1700.

Figure 17B:
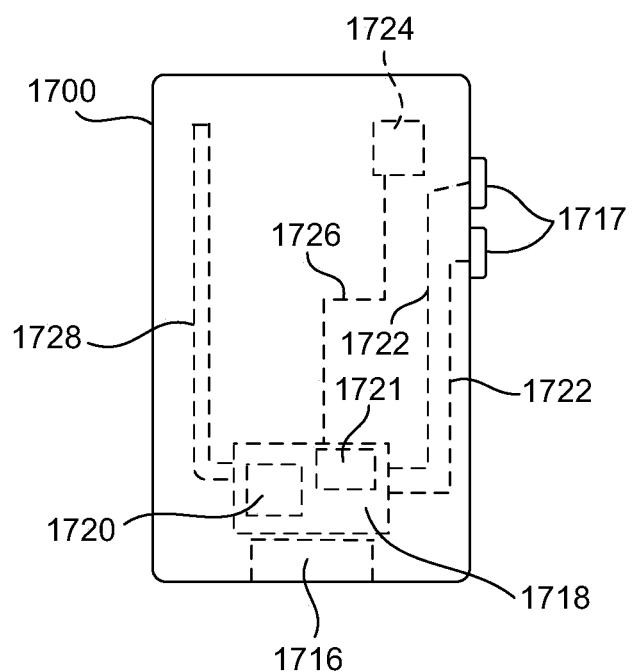
FIG. 17B is a diagram of a back surface of the cover illustrated in FIG. 17A.

FIG. 17B is a diagram of a back surface of the cover 1700 illustrated in FIG. 17A. In this embodiment, the back surface does not include any user interface components. However, in general, the back surface is eligible to include user interface components. In this embodiment, the back surface has various electrical components embedded therein. In particular, as illustrated in FIG. 17B, the cover 1700 include a connector 1716 that facilitates electrical connection of the cover 1700 with the portable electronic device. Internal to the back surface are a substrate 1718 (e.g., flex circuit, PCB) that has at least a controller 1720 and wireless circuitry 1721 mounted thereon, electrical conductors 1722, a camera 1724, one or more electrical conductors 1726, and an antenna 1728. The substrate 1718 is electrically connected to the connector 1716, and the controller 1720 and the wireless circuitry 1721 are or include one or more integrated circuit products (e.g., integrated circuit chips) attached to the substrate 1718. Other electrical components can also be attached to the substrate 1718. The electrical conductors 1722 serve to electrically connect the switches 1714 to the substrate 1718. The camera 1724 provides the cover 1700 with image capture capabilities. The one or more electrical conductors 1726 serves to electrically connect the camera 1724 with the substrate 1718. The antenna 1728 is coupled to the substrate 1718 and serves to support the wireless circuitry 1721 with transmission and reception of wireless signals.

In one embodiment, a cover for a portable electronic device can provide a graphical user interface of a game controller. The game controller acts as a game controller adapter. The game controller can be independent of fixed user input devices (e.g., touch screen) of the portable electronic device or can make use of the fixed user input device of the portable electronic device.

In one embodiment, a cover includes a built-in touch surface on its back surface. In one implementation, the touch surface substantially matches up with a display screen of a portable electronic device on the opposite side.

In one embodiment, a cover includes one or more suction cups on its back surface so that a portable electronic device being covered can be attached to a surface. For example, using the cover, the portable electronic device may be mounted onto a wall or other surface (e.g., a food tray in an airplane).

In one embodiment, a cover for a portable electronic device can include a built-in haptic system. The haptic system may include a plurality of discrete haptic nodes capable of providing discrete haptic feedback, i.e., local feedback in the region of the node. The nodes may for example be piezo actuators. The haptic nodes can be placed throughout the cover or can be provided in limited areas.

In one embodiment, a cover for a portable electronic device can includes a camera (e.g., video camera) on its front surface. The camera may enable video/online conferencing or chatting via a handheld electronic device.

In one embodiment, a cover for a portable electronic device can include one or more embedded antennas. The one or more antennas can support access to wireless networks, such as cellular, WiFi or Bluetooth, etc.

In one embodiment, a covering for a portable electronic device is formed from a compliant or deformable material such that it can be squeezed. The cover may include a kinetic charging system embedded within the cover and configured to produce energy when the compliant covering is squeezed. The energy may be used to charge and/or power the portable electronic device. By way of example, the user may continuously perform a squeezing action in order to charge the battery of the portable electronic device.

In one embodiment, a cover for a portable electronic device includes photovoltaic components, which can be provided as a photovoltaic module. The energy produced by the photovoltaic components may be used to charge and/or power the portable electronic device.

In one embodiment, a cover for a portable electronic device can include a built-in accelerometer and one or more electronically controlled shock mounts. When the cover or portable electronic device senses a drop event using the accelerometer, the shock mounts can be electronically controlled to change from a normal use state to a drop event state so as to operate to protect the portable electronic device against impending impact.

In one embodiment, a cover for a portable electronic device includes a built-in battery. The battery in the cover can thus provide auxiliary power for the portable electronic device. The battery may or may not be removable from the cover. Typically, however, the battery is rechargeable.

A cover may serve as an outer membrane. The outer membrane may be widely varied. In one embodiment, the outer membrane is a compliant, deformable or elastic skin that wraps around a portable electronic device. The compliant or elastic skin may for example include an inner cavity that has an inner shape that substantially coincides with the outer shape of the portable electronic device when the skin is pulled over the portable electronic device. The compliant skin can be formed from a variety of materials. In one embodiment, the skin is formed from silicon rubber. As discussed above, the outer membrane can include a plurality of embedded components as well as a plurality of embedded interconnects that couple the embedded components together. The interconnects may, for example, be wires, traces or flex circuits.

The outer membrane also includes a partially embedded connector that provides an interface between the electrical components and the portable electronic device that is placed within the cavity of the outer membrane. The connector is operatively coupled to the electrical components and is configured to mate with a corresponding connector to allow communications there between. The connector includes a first contact portion that is exposed within the cavity for interfacing with the portable electronic device. In some cases, the connector may also include a second contact portion that is exposed on the outside surface of the membrane and serves as an external connector.

In one embodiment, a cover is formed of a flexible material. It may for example be a bendable or stretchable sheet, enclosure or sleeve. Examples of suitable flexible material include mylar, vinyl, polyester, rubber, fabric, foam, plastic films, etc.

In one embodiment, a cover can be formed from an elastomeric material. Elastomeric materials are capable of resuming their original shape after stretching or compression. As such, a cover may provide support and conform to the shape of the portable electronic device (e.g., it can fit tightly around a portable electronic device). The cover may, for example, be configured as an enclosure or sleeve into which the portable electronic device is placed for scratch prevention, impact protection and contamination control. The enclosure may, for example, be a multi-walled structure that defines a cavity that conforms to the shape of the portable electronic device. In one example, the shape of the inner cavity of the enclosure substantially coincides with the outer shape of the portable electronic device. The enclosure may fully surround, surround a majority, or only surround a small portion of the portable electronic device. Because its elastomeric, the cover can stretch such that an opening to the cavity can be smaller than the dimensions of the portable electronic device itself. The material simply stretches to make way for the portable electronic device being inserted and then resumes to its original shape thereby wrapping itself about the portable electronic device. In some cases, this type of configuration is called a "skin."

The elastomeric material may be formed from elastic polymers such as those known as elastomers. Elastomers are typically thermosets but may also be thermosets. The elasticity can be controlled via transition temperatures of the material selected. In one implementation, the material may be manipulated at a first temperature range to produce less elasticity or at another temperature range to produce high elasticity. The level of elasticity is typically dependent on the needs of the cover.

In one embodiment, a cover can be formed from elastic rubbers (natural and/or synthetics). In one particular implementation, the material for the cover is silicon rubber (silicone rubber). Silicon rubber is inexpensive, and has good resistance to temperature, UV and other aging factors. It is also an inert material and thus it also has good resistance to most chemicals. Furthermore, it can be made highly elastic. Silicon rubber may include a variety of filler to adjust its properties and colors. Silicon can also be formulated as special grades with special attributes. In addition, silicon can be easily formed into a variety of shapes.

In one embodiment, a cover can be formed of a hard plastic. For example, the cover can be formed of polycarbonate or ABS plastic.

In one embodiment, a cover can be formed of a translucent material.

Various techniques may be used to form the desired shape of a cover including for example molding or casting techniques. Various molding techniques include compression molding, transfer molding, injection molding, and the like. Some techniques that may be useful to integrate electronics into the molded part include insert molding and/or double shot injection molding. These and other embodiments will be described in greater detail below.

In one embodiment, electrical components (as well as other structures) may be suspended within a mold, and the material may be allowed to be placed around it such that the electrical components are at least partially and possibly fully embedded within the walls of the cover. In some cases, select portions may be left exposed during molding. In other cases, select portions may be exposed in post molding operations (e.g., stamping, cutting). In either case, the exposed portions may be included for making post mold connections (e.g., between embedded components or between the cover and the portable electronic device). In one example, insert molding techniques may be used. During insertion molding, the mold is loaded with some or all of the electronic structures of the cover. Thereafter, material is forced into the mold (e.g., hot molten material is injected). After allowing the part to cool, the mold is opened and the product is removed. Thereafter, post molding operations are performed. For example, access openings if not part of the molded design are formed using a variety of techniques such as stamping or cutting. In addition, additional structures may be attached to the cover including, for example, more components and/or wires or traces that couple components. By way of example, portions, such as contacts, of the embedded structures may be exposed and traces may be printed on the surface of the cover between components such that they are operatively connected. The circuits may then be tested. Printing of traces and testing may be performed by folding the cover inside out. Thereafter, any remaining exposed structures (other than the connection point between the cover and the portable electronic device) may be covered up through use of coatings, epoxies, labels or more cover material. It should be appreciated that other structures may be insert molded including for example attachment mechanisms and/or ornamental features.

Alternatively or additionally, a cover may be formed from multiple layers that are applied successively. For example, the cover may be formed from a first layer and a second layer, both of which can be formed using successive molding operations. In on example, the first layer is formed. This may include no structure, partially embedding one or more structures, or fully embedding one or more structures. Thereafter, if desired, more electronic parts can be added as, for example, by attaching to an inner surface of the first layer. Also, traces, wires, or flex circuits can be added thereby making connections between components. Testing can also be performed. Thereafter, a second layer is formed over the first layer and over exposed electronics or circuitry (except the connection mechanism between the cover and portable electronic device remain exposed). In one implementation, a double shot injection molding techniques can be used. Double shot molding is a process for producing two integral parts by utilizing successive molding methods. In one example, material is forced into a first mold to form a first layer. Thereafter, either a half of the mold or the part is transferred to another mold (thereby acting as an insert). Thereafter material is forced into the second mold to form a second layer that integrally affixes to the first layer. In some cases, the same material is used. In other cases, different materials or the same material with different properties is used.

In some cases, exposed parts may be covered instead of or in addition to double injection molding. The covering applied may be provided by coatings, epoxies, paints, films and the like.

Figure 18:
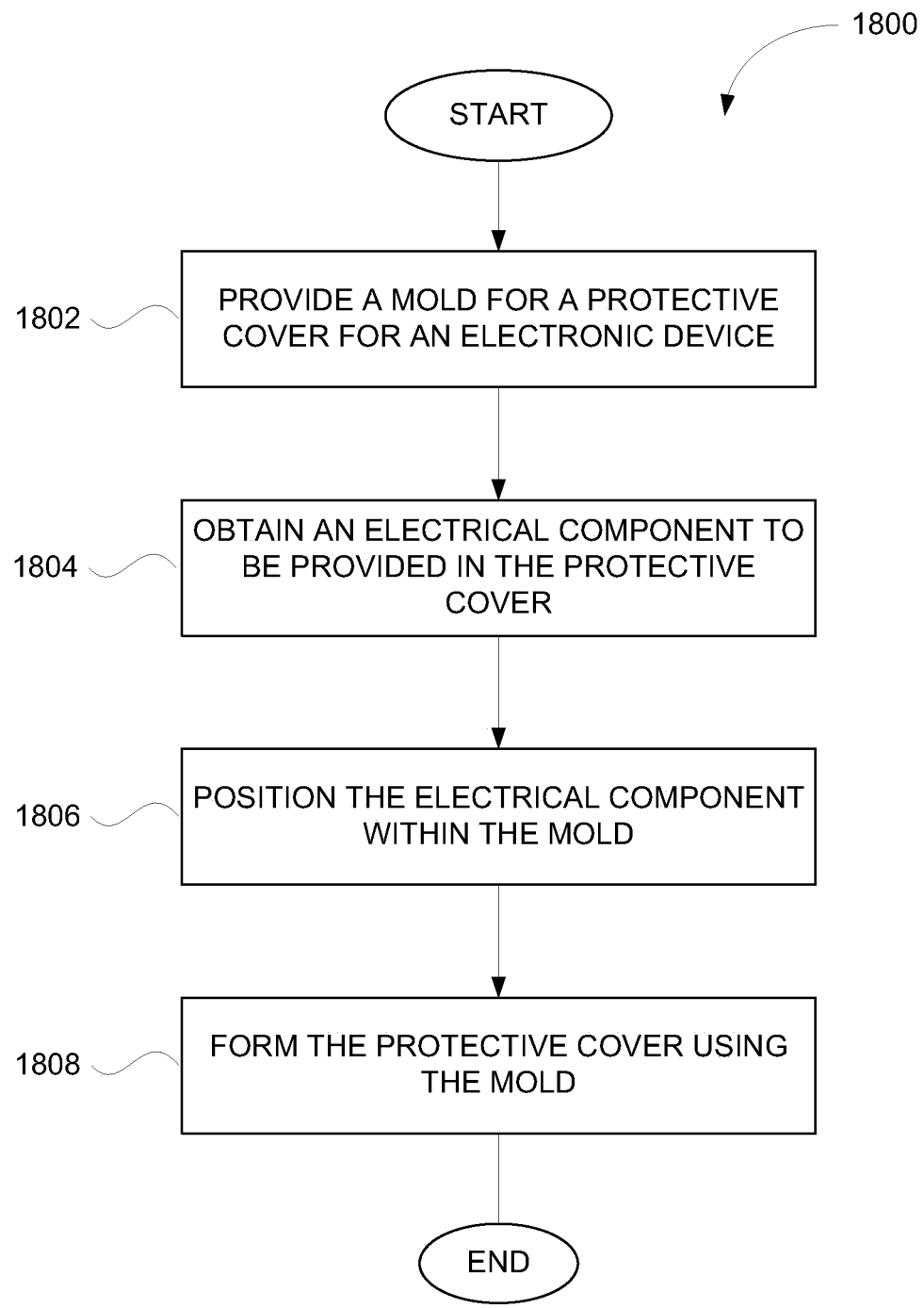
FIG. 18 is a flow diagram of a cover formation process according to one embodiment of the invention.

In one embodiment, a cover may also be formed as a laminate part. For example, the cover may include an outer layer (e.g., flexible sheet or label), one or more components attached thereto, and an inner adhesion layer. The adhesion layer allows the laminate structure to be attached to an outer surface of a portable electronic device. The components may include wires or traces as mentioned above. Furthermore, in order to provide a uniform cover, a filler may be included between the outer and inner layers between the components FIG. 18 is a flow diagram of a cover formation process 1800 according to one embodiment of the invention. The cover formation process 1800 is suitable for forming a protective cover having an electrical component.

The cover formation process 1800 provides 1802 a mold for a protective cover for an electronic device. Here, a mold can be created to form the protective cover. The protective cover will eventually be utilized to cover a significant portion of an electronic device. An electrical component to be provided in the protective cover is also obtained 1804. As discussed above, the electrical component can take many forms and can be positioned in the protective cover at various locations. Next, the electrical component can be positioned 1806 with the mold. By positioning in the electrical component within the mold, the electrical component can be placed at a particular location with respect to the protective cover to be formed. Thereafter, the protective cover can be formed 1808 using the mold. For example, a molding compound can be injected into the mold, allowed to cure and then removed from the mold. The cured molding compound forms the protective cover whereby the electrical component is secured or embedded in the molding compound that forms the protective cover. Following the formation 1808 of the protective cover, the cover formation process 1800 can end.

In one embodiment, the electronic device to be covered may further be a hand-held electronic device. The term hand-held generally means that the electronic device has a form factor that is lightweight (e.g., less than about 1 pound (or 0.5 kilograms) and small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels.

The one or more electronic subassemblies that are part of the outer covering may be widely varied. The electronic subassemblies may include one or more electronic components such as integrated circuits (i.e., chips), circuit boards, flex circuits, wires, Light Emitting Diodes (LEDs), electronic circuits, switches, and other circuitry. The electronic subassemblies may, for example, extend Input/Output (I/O) of the portable electronic device into the covering (e.g., visual indicators, display, audio, tactile, haptics, buttons, switches, detectors, touch pads, navigation pads, joysticks, keys, etc). Additionally or alternatively, the electronic subassemblies may, for example, be associated with one or more sensors include for example accelerometers, GPS, proximity, biometric, force and/or the like that extend the capabilities of the portable electronic device. Additionally or alternatively, the electronic subassemblies may, for example, be associated with a connection interface (e.g., mechanical connector, inductance, wireless). Additionally or alternatively, the electronic subassemblies may, for example, be associated with memory, CPU or processing capabilities, battery, solar charging, kinetic charging, antenna (multiple selectable antennas, supplemental antennas, boosters, etc.), and others. Additionally or alternatively, the electronic subassemblies may, for example, be associated with software upgrades or new software applications. For example, the outer covering may include a memory device including a new software application with a new I/O dedicated to the new application. Additionally or alternatively, the electronic subassemblies may, for example, be associated with card slots as for example SIMM cards, flash cards, memory cards, game cards, etc.

The subassemblies may be operatively coupled to the portable electronic device via wired or wireless connections. If wired, at least one of the subassemblies may be associated with or coupled to a connector that plugs into or otherwise mechanically interfaces the portable electronic device. The connector may, for example, be a data and/or power connector. The connector may include various pins or contacts that support various signals. Examples include USB, Firewire that include 4-6 pins. Other examples include connectors with larger pin layouts such as for example the 30 pin connector that support iPods and iPhones manufactured by Apple Inc. of Cupertino, Calif. In one implementation, the connector includes a first connector that mates with the portable electronic device and a second connector that extends the portable electronic device's connector to the outside of the outer covering (e.g., male/female connectors). For wireless capabilities, the subassemblies may include one or more various chipsets that support wireless functionality of the portable electronic device including for example Bluetooth, 802.11, RF, IR, etc.

In one implementation, the outer covering is compliant and the one or more subassemblies and associated circuitry are at least partially embedded within the compliant outer covering. For example, the material may be molded around a portion of the subassembly including associated circuitry and wiring such that the subassembly and the outer covering become a single integral unit. In one example, insert molding techniques are used to mold around the various subassemblies. The subassemblies may be fully embedded, embedded with an exposed internal surface or feature, or embedded with an exposed external surface or feature, or embedded with an exposed internal and external surface or feature. Additionally or alternatively, the subassemblies may be applied to the surfaces of the outer covering rather than being fully or partially enclosed within the outer covering. For example, the subassemblies may be attached to an internal surface of the outer covering and, the subassemblies may be attached to an external surface of the outer covering. As should be appreciated, any combination of embedded and surface mount may be used to achieve the desired effect. For example, in one embodiment, the subassemblies are only embedded. In another embodiment, the subassemblies are only surface mounted. In yet another embodiment, the subassemblies are both embedded and surface mounted.

When the outer covering is flexible or compliant, the subassemblies may be configured to facilitate or allow flexing/stretching. For example, the subassemblies may be spaced apart or spread out such that the compliant material is able to stretch. In other examples, the subassemblies may be formed as small components or broken up into smaller components thereby reducing the rigidity of the entire system. In other examples, the wires that connect subassemblies may include some slack such that during stretching or flexing they do not become a pinch point to the flexibility of the entire system.

In some cases, the outer covering may be user configurable such that they select the desired subassemblies when purchasing/ordering the outer covering. In one example, the user may create a customized I/O. The outer shape may also be user configurable for example the outer covering may be form fitted to a user's hand shape (making it more ergonomic).

In some cases, the outer covering may be replaceable or disposable. For example, it may include a one-time use disposable battery. In some cases, the outer covering may be upgradeable. For example, it may include standardized attachment points or regions where mechanical and/or electronic and/or optical systems may be connected.

A connection interface that may be provided between a portable electronic device and a cover (outer covering). In one embodiment, the portable electronic device includes an exposed connector on one of its outer surfaces and the cover includes a corresponding exposed connector region on an under surface configured to be placed against the outer surface of the portable electronic device. The under surface may for example be an internal surface within a cavity of the cover that surrounds the portable electronic device. Although the connector region may be placed anywhere on the portable electronic device, the connector region can be placed on the back side of the portable electronic device. Alternatively, it may be placed on the bottom side of the portable electronic device. The connector region may include one or more exposed contact pads or pins configured in a variety of layouts and shapes.

The various aspects, embodiments, implementations or features of the invention can be used separately or in any combination.

The advantages of the invention are numerous. Different embodiments or implementations may, but need not, yield one or more of the following advantages. One advantage of certain embodiments of the invention is that a cover having one or more electronic components embedded therein can serve to extend or augment capabilities of a portable electronic device being covered by the cover. For example, the one or more electrical components provided in a cover can be used (i) to extend input/output capabilities of the portable electronic device, (ii) to augment functional capabilities of the portable electronic device; and/or (iii) to associate ornamental aspects to the portable electronic device.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An accessory for a portable electronic device having a display, a device connector, and a housing that carries electrical circuitry, the accessory comprising:
    a body defining a cavity sized and shaped to receive the portable electronic device, the body having access openings including a first opening capable of providing access to the display;
    an alphanumeric keypad having user input buttons, the alphanumeric keypad being carried by the body and accessible at an outer surface of the body, wherein the user input buttons are capable of receiving user input for entering alphanumeric characters, and the user input buttons includes a first input button positioned at a first side of the first opening and a second input button positioned at a second side of the first opening that is opposite to the first side;
    a data capture sensor;
    a power module including a rechargeable battery;
    a male connector extending from the body and into the cavity and configured to mate with the device connector, the male connector including at least one data pin; and
    a controller carried by the body and electrically coupled to the alphanumeric keypad and the male connector, the controller configured to, in response to receiving the user input, transmit data associated with the user input to the portable electronic device through the at least one data pin.

2. The accessory of claim 1, wherein the portable electronic device further includes an input device, and the accessory further comprises:
    a second opening capable of providing access to the input device.

3. The accessory of claim 1, further comprising:
a joystick input device carried by the body and accessible at the outer surface of the body,
wherein the joystick input device is electrically coupled to the controller and the controller is configured to transmit signals to the portable electronic device through the at least one data pin.

4. The accessory of claim 1, further comprising:
a wireless antenna embedded within the body.

5. The accessory of claim 4, wherein the wireless antenna supports access to Bluetooth signals.

6. The accessory of claim 1, wherein the data capture sensor includes at least one of an accelerometer, a force sensor, an image sensor, a microphone, a biometric sensor, a temperature sensor, a light sensor, or a proximity sensor.

7. The accessory of claim 1, wherein the body is formed of a deformable material, and a shape of the body is conformable to the housing of the portable electronic device.

8. The accessory of claim 7, wherein the body is formed of rubber.

9. A detachable keyboard for a portable electronic device having a display, a device connector, and a housing that carries electrical circuitry, the detachable keyboard comprising:
a body defining a cavity sized and shaped to receive the portable electronic device, the body having an access opening to provide access to the display;
an alphanumeric keypad carried by and accessible at an outer surface of the body, the alphanumeric keypad including keys that are capable of receiving user input for entering alphanumeric characters, wherein the keys include a first key and an opposing second key that are positioned on the body and at opposite ends of the access opening;
a wireless antenna embedded within the body;
a power module including a rechargeable battery;
a male connector extending from the body and into the cavity and configured to mate with the device connector, the male connector including at least one data pin; and
a controller embedded within the body and electrically coupled to the alphanumeric keypad and the male connector, the controller configured to transmit data associated with the user input to the portable electronic device through the male connector and the at least one data pin.

10. The detachable keyboard of claim 9, wherein the body is formed of a deformable material, and a shape of the body is conformable to the housing of the portable electronic device.

11. The detachable keyboard of claim 9, further comprising:
a data capture sensor, wherein the data capture sensor includes at least one of an accelerometer, a force sensor, an image sensor, a microphone, a biometric sensor, a temperature sensor, a light sensor, or a proximity sensor.

12. An accessory for a portable electronic device having a display, a device connector, and a housing that carries electrical circuitry, the accessory comprising:
a body configured to carry the portable electronic device, the body including a first opening to provide access to the display;
a connector integral with the body;
a user input device carried by the body, wherein the user input device includes a first input button and an opposing second input button that are positioned at opposite ends of the first opening, and the user input device is capable of receiving user input;
a data capture sensor; and
an electronic subassembly coupled to the user input device and embedded within the body, the electronic subassembly including:
a memory configured to store instructions, and
a processor operatively coupled to the memory and configured to execute the instructions to carry out operations associated with an exchange of data between the accessory and the portable electronic device in response to receiving user input from the user input device, wherein the user input device and the processor are configured to interact with the electrical circuitry to augment capabilities of the portable electronic device.

13. The accessory of claim 12, wherein the body defines a cavity capable of carrying the portable electronic device within the cavity.

14. The accessory of claim 13, further comprising:
a male plug connector that extends into the cavity and is configured and positioned to mate with the device connector when the portable electronic device is carried by the body.

15. The accessory of claim 14, further comprising:
a receptacle connector.

16. The accessory of claim 15, wherein the receptacle connector is compatible with the male plug connector.

17. The accessory of claim 12, wherein the body further includes a second opening to provide access to an input device of the portable electronic device.

18. The accessory of claim 12, wherein the user input device comprises a force feedback device.

19. The accessory of claim 12, wherein the data capture sensor includes at least one of an accelerometer, a force sensor, an image sensor, a microphone, a biometric sensor, a temperature sensor, a light sensor, or a proximity sensor.

20. The accessory of claim 12, wherein the body is formed of a deformable material, and a shape of the body is conformable to the housing of the portable electronic device.

* * * * *